US009488487B2

(12) United States Patent
Andersen

(10) Patent No.: US 9,488,487 B2
(45) Date of Patent: Nov. 8, 2016

(54) ROUTE DETECTION IN A TRIP-ORIENTED MESSAGE DATA COMMUNICATIONS SYSTEM

(71) Applicant: YAHOO! INC., Sunnyvale, CA (US)

(72) Inventor: Jesper Sparre Andersen, Oakland, CA (US)

(73) Assignee: YAHOO! INC., Sunnyvale, CA (US)

( * ) Notice: Subject to any disclaimer, the term of this patent is extended or adjusted under 35 U.S.C. 154(b) by 0 days.

(21) Appl. No.: 14/580,482

(22) Filed: Dec. 23, 2014

(65) Prior Publication Data

US 2016/0003637 A1 Jan. 7, 2016

Related U.S. Application Data

(60) Provisional application No. 61/899,056, filed on Nov. 1, 2013.

(51) Int. Cl.
*G01C 21/00* (2006.01)
*G01C 21/36* (2006.01)
*G06F 17/30* (2006.01)

(52) U.S. Cl.
CPC ......... *G01C 21/3617* (2013.01); *G01C 21/362* (2013.01); *G06F 17/30241* (2013.01)

(58) Field of Classification Search
CPC ............ G01C 21/3617; G01C 21/005; G01C 21/362; G01C 21/3632; G06F 17/30241
USPC ........................................................ 701/519
See application file for complete search history.

(56) References Cited

U.S. PATENT DOCUMENTS

| 6,249,252 | B1* | 6/2001 | Dupray | G01S 1/028 342/357.29 |
| 7,945,026 | B2* | 5/2011 | Lorello | H04L 29/06027 379/37 |
| 8,185,567 | B2* | 5/2012 | Mitchell | G06F 17/3087 707/725 |
| 2007/0233817 | A1* | 10/2007 | Johnson | G01C 21/005 709/219 |
| 2015/0186497 | A1* | 7/2015 | Patton | G06F 17/30598 707/740 |

* cited by examiner

*Primary Examiner* — Behrang Badii
*Assistant Examiner* — Michael Berns
(74) *Attorney, Agent, or Firm* — Hickman Palermo Becker Bingham

(57) ABSTRACT

In an embodiment, a data processing method provides an improvement in personal tracking and comprises, using a server computer, obtaining a plurality of personal calendar records, wherein each of the calendar records comprises a location value specifying a geographical location of an event, and a start time value specifying a start time of an event at the location; using the server computer, obtaining a plurality of present location updates, wherein each of the present location updates comprises a geo-location value indicating a then-current location of a computing device; using the server computer, creating and storing polygon data that defines a polygon in geographical space that contains a final set of the plurality of location values; using the server computer, determining a street address that is contained in the polygon; creating and storing a database record that associates a particular calendar record with the street address.

20 Claims, 25 Drawing Sheets

Fig. 22

| 2202 | Cameron | Joshua | Filip | Michael | Ryan 2206 | David |
|---|---|---|---|---|---|---|
| Cameron | | 2208 | 2208 | 2208 | 2208 | 2208 |
| Joshua 2206 | 0.027 | | 2208 | 2210 | 2208 | 2208 |
| Filip | 0 | 0 | | 2208 | 2208 | 2208 |
| Michael | 0 | 0.673 | 0 | | 2210 | 2208 |
| Ryan | 0.004 | 0.381 2204 | 0 | 0.704 | | 2208 |
| David | 0 | 0 | 0 | 0 | 0.008 | |

ROUTE DETECTION IN A TRIP-ORIENTED MESSAGE DATA COMMUNICATIONS SYSTEM

BENEFIT CLAIM

This application claims the benefit of provisional application 61/899,056, filed Nov. 1, 2013, the entire contents of which are hereby incorporated by reference for all purposes as if fully set forth herein.

FIELD OF THE DISCLOSURE

The present disclosure relates to data processing. The disclosure relates more specifically to data communications systems that provide messaging and other data services based upon trip planning, schedule interpretation, and other functions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Rapid expansion in the computing capability of mobile computing devices such as smartphones, tablet computers and other portable devices, and the concurrent explosion in the number and advancement of software program applications or "apps" for mobile devices, has greatly increased the dependence of working professionals on devices, apps and related platforms in the field of personal productivity. For example, apps are widely used for scheduling meetings, determining travel routes, selecting transit modes, and other functions.

However, in present practice extensive manual interaction with a large number of different apps is typically needed to determine the best route or transit mode to a particular location. For people who travel frequently, or who have a heavy schedule of meetings with extensive use of calendars, email, and other apps for planning, scheduling, and transit, there may be insufficient time between events, meetings or locations to manage the required interaction with multiple different apps.

BRIEF DESCRIPTION OF DRAWINGS

In the drawings:

FIG. 22 illustrates an example comparison chart that could be used to determine whether to recommend that pairs of users may wish to perform fitness activities together.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. Server Computer Architecture

Embodiments may be implemented using a client-server computing system in which end user computers, which may be mobile computing devices or non-mobile computing devices, communicate directly or indirectly through one or more local area networks, wide area networks, or internetworks, to one or more server computers that are configured to perform the processing techniques that are further described herein. In one embodiment, the server computer features a three-layer architecture comprising an object layer, an object management layer or library layer, and a representational state transfer (REST) API layer that provides an interface to client computing devices.

The object layer comprises programmatic objects that implement lower-level services such as database access, schema definition, object relationship management, and similar functions.

In an embodiment, the library layer is implemented using a plurality of computer program components that facilitate adding other library layer functions. The library layer is configured to implement base-level functionality in several ways. For example, the library layer may manage relationships between objects in the object schema or model that is further described herein, and organize object data on a per-user basis. The library layer may implement create, read, update and delete (CRUD) actions for objects that conform to a specified object schema, as further described herein. The library layer may also implement object manipulation methods, and may implement functions or methods that are callable both internally and externally. For example, internal calls may come from other library functions, and external calls may be received using REST; that is, the library layer may implement a REST API that provides external access to the object management functions of the library layer.

Figure 1:
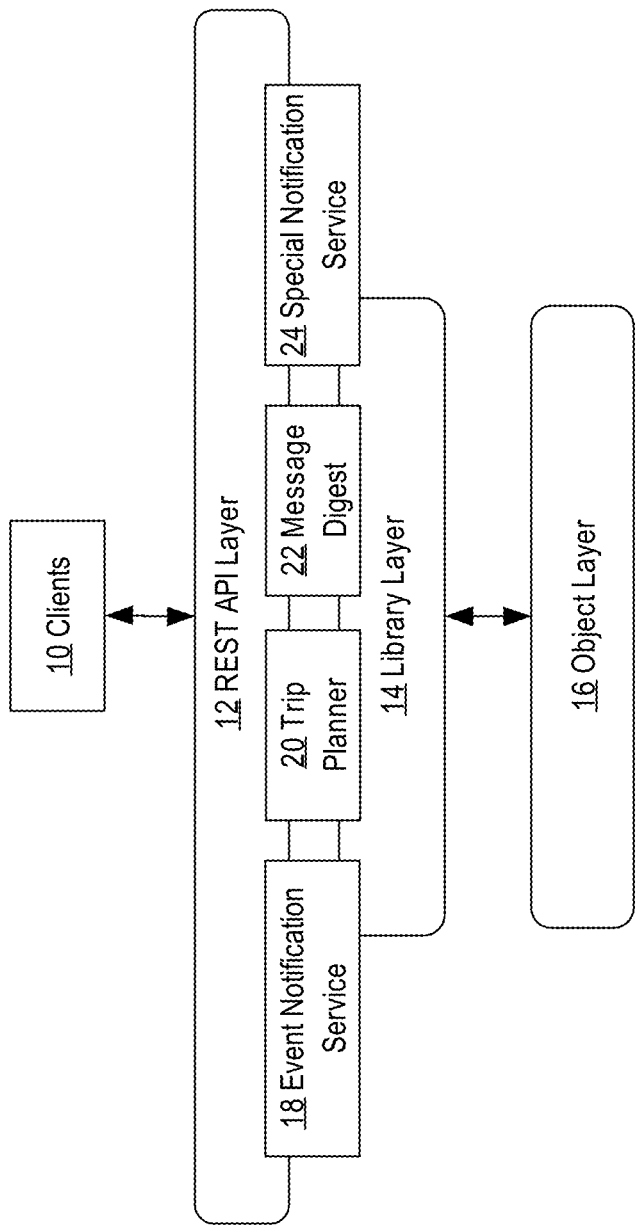
FIG. 1 illustrates an example computer architecture for an embodiment.

FIG. 1 illustrates an example computer architecture for an embodiment. A plurality of clients 10 are coupled directly or indirectly via one or more computer networks to a server computer that comprises a REST API layer 12, library layer 14, and object layer 16. Each layer 12, 14, 16 may comprise one or more computer programs or other software elements in main memory and/or other storage that may implement the functions that are further described herein. In an embodiment, REST API layer 12 provides the clients 10 with programmatic access, using REST requests over HTTP, to an event notification service 18, trip planner 20, message digest 22, and special notification service 24. These services, the functions of which are described further herein, call functions in the library layer 14 for supporting functionality. The object layer 16 represents areas of memory or other storage in which programmatic objects are instantiated and managed.

Figure 3:
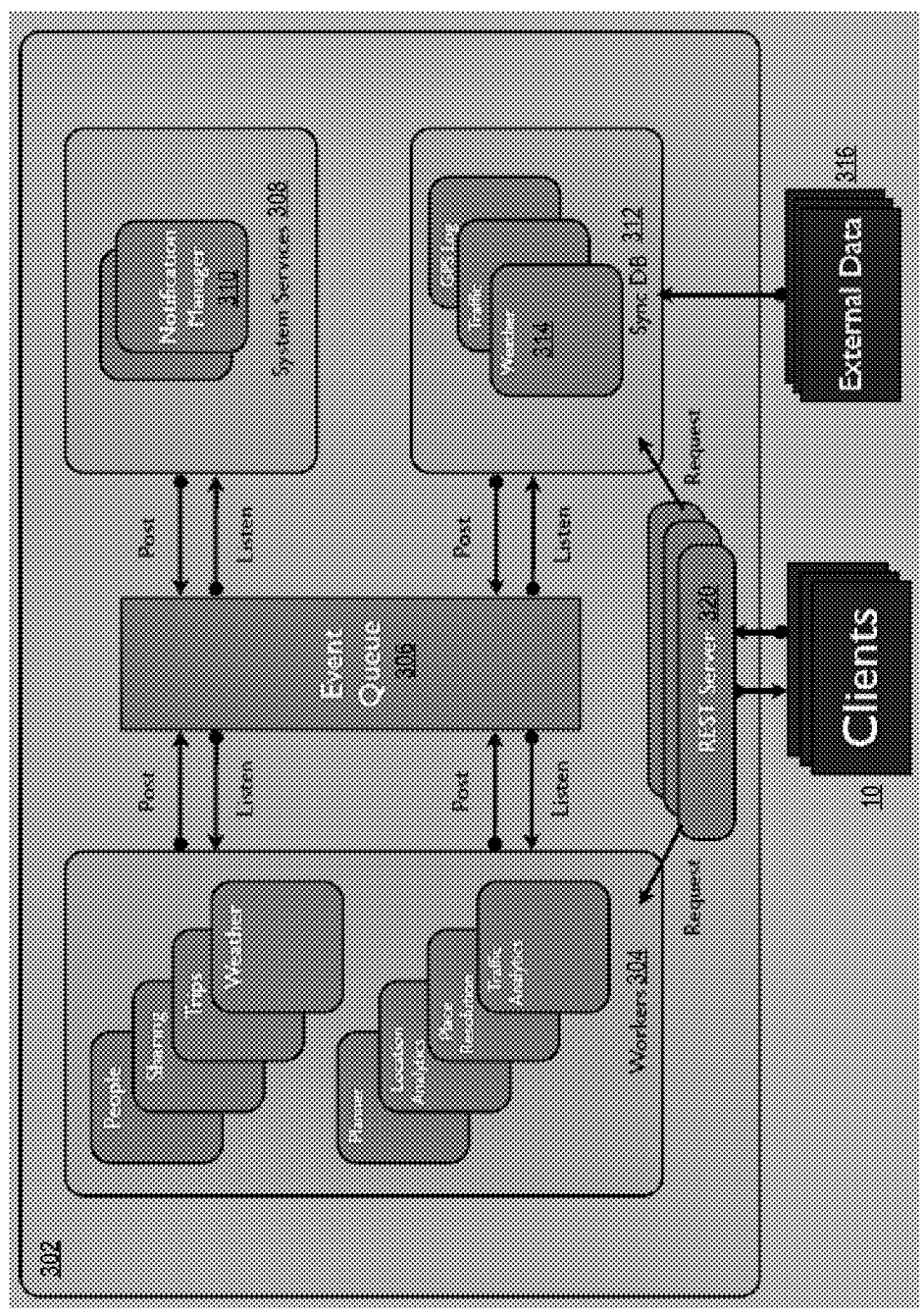
FIG. 3 illustrates an example server computer architecture using worker processes.

In another embodiment, the server computer may be implemented using a plurality of worker processes rather than library modules. FIG. 3 illustrates an example server computer architecture using worker processes. In an embodiment, a plurality of worker processes 304 in server computer 302 implement functions such as trip planning, semantic analysis or normalization of location data, place resolution, traffic analytics, and other functions. In this context, place resolution refers to obtaining address data and resolving its meaning using other data or algorithmic techniques. Worker processes also may implement or provide weather updates, stored trip data, object or data sharing, and people information. The worker processes may post event objects to an event queue 306 and listen for specified event objects on the event queue. The event queue also may be coupled to system services 308 such as a notification manager 310. The event queue may be coupled to a synchronization database 312 that maintains tables or records for information such as weather 314, traffic, public transit, Global Positioning System (GPS) input or logs, and other data obtained from external data sources 316. Client computing devices 10 may interact with the worker processes and synchronization database through a REST server 320, which transforms client requests into requests to the worker processes and synchronization database, and provides responses.

In an embodiment, a data processing method provides an improvement in personal tracking and comprises, using a server computer, obtaining a plurality of personal calendar records, wherein each of the calendar records comprises a location value specifying a geographical location of an event, and a start time value specifying a start time of an event at the location; using the server computer, obtaining a plurality of present location updates, wherein each of the present location updates comprises a geo-location value indicating a then-current location of a computing device; using the server computer, creating and storing polygon data that defines a polygon in geographical space that contains a final set of the plurality of location values; using the server computer, determining a street address that is contained in the polygon; creating and storing a database record that associates a particular calendar record with the street address.

In general, in an embodiment, the event notification service is configured to form and deliver event notifications to end user computing devices. Typically such event notifications pertain to ordinary upcoming events such as meetings that have been obtained from third party calendar data sources associated with the user.

In an embodiment, the trip planner unit is configured to perform trip planning functions based upon obtaining, from a third party calendar application or other data repository, personal calendar information in combination with map, distance or location information obtained from one or more other sources, as further described herein. The trip planner unit is configured to instantiate trip objects based upon the current location of an end user and a destination. Location data may be pushed from the end user's mobile computing device to the server computer. The trip planner unit also is configured to predict a future location of the user for the purposes of performing trip calculations. For example, a user location may be predicted based on identifying a location of an upcoming event in the calendar data of the user. The location of an upcoming event may be used as either the origin or destination of a planned trip, depending on the context; for example, if the current time is 11:00 AM and the user has calendar entries for a first meeting at 2:00 PM in Alpha City, and a second meeting at 4:00 PM in Beta Town, then Alpha City is both the destination of a first trip from the user's current location to reach the first meeting, and is the origin of a second trip from Alpha City to Beta Town to reach the second meeting.

In an embodiment, the trip planner unit is configured to reuse existing trips that were previously calculated and stored in the database, based upon matching the origin and destination of an upcoming trip to origin and destination values stored in the database for prior trips. In an embodiment, the trip planner unit may implement interfaces to a plurality of map data sources and may select a particular map data source for use in computing a particular trip based on data values that are known for that trip. For example, the trip planner unit may implement interfaces to map data from GOOGLE, BING, and MAPQUEST.

In an embodiment, the trip planner unit is configured to calculate a time to leave for future events and to calculate notification data based on the time to leave. For example, in an embodiment operable for the example above, if Beta Town is 30 miles from Alpha City, the user is known to be driving, and map data indicate a route travel time of 30 minutes, then the trip planner unit could create a calendar event, or provide a notification to the user's mobile computing device, informing the user to depart for Beta Town at 3:30 PM. Alternatively, the trip planner unit could create an event informing the user to depart for Beta Town at 3:20 PM to allow for time-consuming contingencies such as moving from a current location to a vehicle, parking the vehicle, etc. In an embodiment, data created by the trip planner unit may be cached at the server computer for delivery to the client computing device via API calls. For example, the client computing device may be configured with a client application or "app" that periodically issues an API call to the message digest unit requesting delivery of any cached notifications, events, messages or message digests that have been created for the user.

In an embodiment, the trip planner unit is configured to predict one or more upcoming trips for a user. In trip prediction, the future location of the user is predicted based on assuming that the user was actually at the location of a prior event in the user's calendar, and a route to the next event is computed from the location of the prior event. In one embodiment, the trip planner unit may be configured to request or obtain current location data from the user's mobile computing device to verify that the user is actually at or near the known location of a current event that is prior to the next event for which a route is to be calculated. Trip prediction may be implemented in a separate worker process in the server computer.

Trip prediction may be performed at various times in various embodiments. For example, trip calculations may be performed in response to detecting a new calendar event in the user's calendar. Alternatively, trip calculations could be performed approximately one week before an event in the calendar, or at another interval. Trip calculations may take into account third party traffic data sources that may be used to obtain traffic congestion data along the calculated route on different days at the same time as the transit time that the user will use for the future trip. Embodiments may also submit data to a third party traffic prediction model and obtain a result for use in route calculations.

In an embodiment, the trip planner unit is configured to predict one or more upcoming trips for a user using the following process. The user's calendar is inspected for a specified timeframe; for example, if the user maintains a calendar using a GOOGLE account, the server computer sends an API call to the GOOGLE service with appropriate authentication credentials to obtain calendar data for the current day, a range of several days, or another period. The process creates one or more event objects, each event object representing a particular event obtained from the calendar data in the specified timeframe. The process fetches all event objects for the same user that are in the cache. The event objects created for current events are compared to the cached event objects to determine if updates have occurred. If no events have changed, then no new trip is calculated. However, if a particular event object changed, then the process computes a new trip for that event, computes new notification data, and creates and persistently stores a new message object for delivery in the user's next message digest that includes the notification data.

In an embodiment, the trip planner unit is configured to perform planner operations not involving prediction using the following process. The current location of a user is obtained from the user's mobile computing device. The user's preferred travel mode is obtained from account profile data or user profile data stored in the database. One or more current event objects for the user are obtained from the database, based on the user's current calendar data. Cached event, trip, and message data for the user is obtained from the cache. The new event objects are compared to the cached event objects. If any event object has changed, and a corresponding trip object and message object have not been found in the cache, then a new trip object and message object are computed and stored for communication to the user.

In an embodiment, the new event objects are compared to the cached event objects according the following process.

1. If a new event does not include location data indicating a place, do not attempt to determine a trip.
2. If the new event starts within 1 hour from the current time, attempt to determine a trip.
3. If the place of the event has changed, attempt to determine a trip.
4. If the start time of the event has changed, attempt to determine a trip.
5. Determine an origin location for the trip. If the origin matches an origin value in the cache, do not attempt to determine a trip.
6. Perform trip computations for all appropriate events that have been identified as a result of the foregoing steps.
7. Compute notification data for all such appropriate events.
8. Mark notification data as obsolete for any events that have been deleted or marked obsolete.

In this context, a trip may be an object that represents the idea of traveling from one point to another. A trip is uniquely identified by the person making the trip, an origin, and a destination. The origin and destination are place objects. Place objects can currently represent a specific named place with an address, or the user's current location, which is not associated with any real world building, address, or otherwise, as a latitude-longitude value pair.

In an embodiment, an origin may be any of: The "place" of the event previous to the current one; The current location of the user (when calculating trips that are upcoming); The predicted location of the user (when calculating trips in the future for example). A destination may be a place with a named location/address.

In an embodiment, trips are generated when the planner runs on an event within the planner interval. In an embodiment, one route is calculated for the fastest trip in the preferred mode. In an embodiment, trips also are generated when a user navigates to the event details page for one specific event; in an embodiment, up to 12 routes are generated, up to 3 for any of the 4 available travel modes (walk, bicycle, drive, public transit) that make sense.

In an embodiment, when a client (either the planner, or a remote client) requests a trip, one should be generated, or one should be reused. In an embodiment, a new trip object is generated every time a trip is requested. This may result in a large number of out-of-date trips, and a large number of redundant trips; returning existing trips may be performed whenever possible.

In an embodiment, the system can re-use the same trip for origins which only vary slightly. In an embodiment, the threshold for sameness may be determined using reverse geocoding, or using a haversine comparison of the origin with the user's current location or desired embarkation point.

In an embodiment, the system is configured to reconcile the different amounts of directions generated for various cases. The planner will be generating directions every few minutes for events that are coming up soon. These directions will only contain one option: the fastest trip for the current preferred travel mode for the event. If the planner comes across a recent trip with multiple directions, it should use that, and choose the appropriate mode. If the client request comes across a recent trip with only one direction, it will need to generate a new one with all route options, or find another recent one that has all trip options.

Recomputing trip directions may be performed when the origin of the trip is sufficiently far away from the origin of the existing trip, or the time has changed sufficiently enough. In an embodiment, a history of generated directions for a particular trip may be stored for purposes of analysis.

In one embodiment, the planner is configured to make predictions about the user's upcoming activities and needs, for example based on the contents of the user's calendars. The event is the primary input data object. Based upon event information such as start time, end time, desired mode of travel and location, the planner is able to predict when the user must leave their previous location to get to their event on time.

The above mentioned information is not sufficient in many instances to make an accurate prediction. If there is a prior event on the user's calendar temporally close to the event of interest, the planner must take into account the user's "current" location based on the location of that previous event. The corresponding calculations of when to leave and travel duration are then informed by the previous event. Given the above considerations, the planner may process the user's daily events as a graph, in which prior conditions affect subsequent ones.

The planner seeks to satisfy a number of sometimes conflicting goals: Generate trip and notification info for each event; Predict the user's origin location for each trip; Only execute subsequent planning ops if a relevant condition has changed; Use cached results when possible. To this end, the planner caches the results of its processing, persisting them to the server primary data store, such as a MySQL database, for future use. At the start of a subsequent planning run, the cached results are read from the data store, and compared with the current, possibly updated, event info. If cached results exist for a given event (trip and notification info), the cached and new event info is compared to determine whether a) the cached results can be used, thus short-circuiting the need for subsequent planning, or b) new planning results must be computed.

Finally, once all cached and current event info is compared, and new results are computed, the planning output is persisted to the db. Other server components may utilize the cached planner output for their own purposes, as this output represents highly relevant information about the user. One such consumer of planner output is the Message Digest API, which clients use to obtain trip information for display on mobile clients. Another such consumer is the Notification Engine, which send APNS notifications to IOS clients.

In an embodiment, the planner is built as a state machine in which a single execution processes the events from a user's calendar for a given timeframe. The basic steps involved in a planning run are: 1. Lookup cached planner output (events, trips, notifications); 2. Lookup user's plan time location; 3. Lookup user's preferred travel mode; 4. Lookup events for specified planning window (start/end time); 5. Compare cached events to current events. If no cached event exists, plan based on new event. If cached event exists, compare to new event for updates If new event has been updated, plan based on new event If new event has not been updated, use cached info. 6. For updated events, execute planning: Predict origin location; Resolve event location; Compute trip for all travel modes; Compute time-to-leave for event; Compute notification text; Persist trip and notification info.

Figure 2:
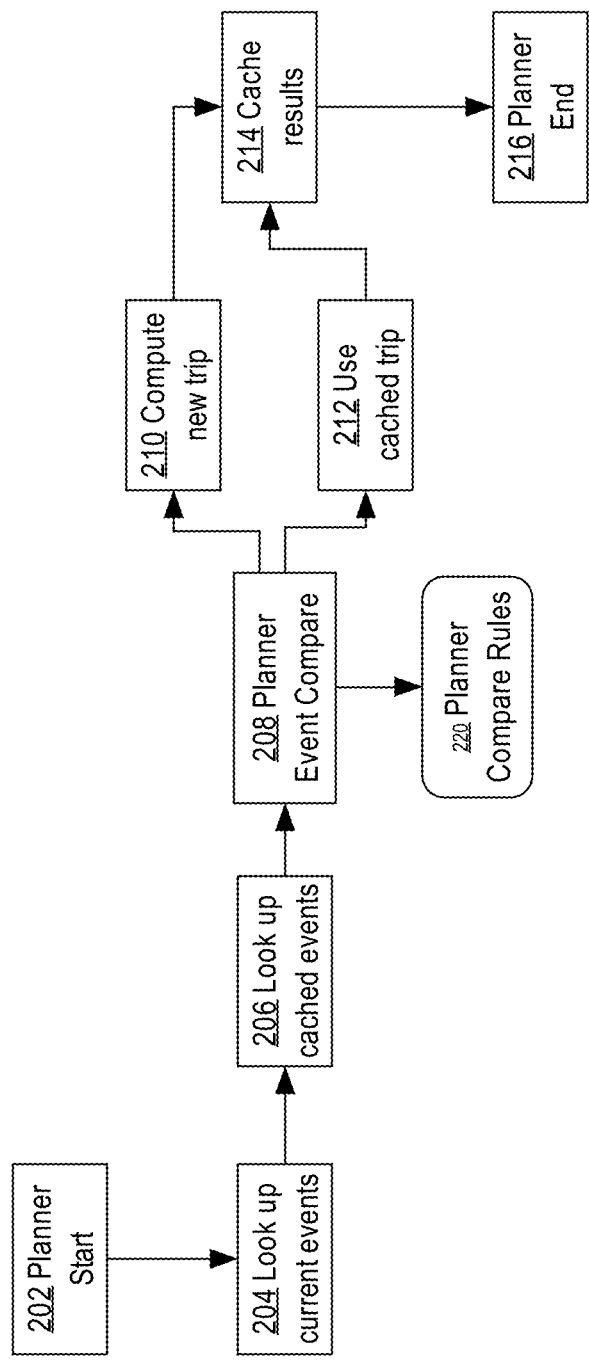
FIG. 2 illustrates an example process flow that may be implemented using the trip planner.

FIG. 2 illustrates an example process flow that may be implemented using the trip planner. In an embodiment, the trip planner starts operation at block 202, for example, in response to an event or notification from another functional unit, as described above. At block 204, one or more current events are looked up or obtained from an event store, such as a calendar. At block 206, one or more events are obtained from an event cache, which may be maintained in main memory or shadowed to persistent disk storage, for example. At block 208, the events are compared and logical decisions are made about whether the current events require computing a new trip or whether cached trip data—for example, representing a prior trip to the same location that is associated with a current event—need to be computed.

At block 210, depending on the decision of block 208, a new trip is computed. At block 212, a cached trip is used. At block 214, the results of computing the new trip and/or possibly updating cached trip data are cached. At block 216, the planner process of FIG. 2 is complete.

Decisions at block 208 may be based upon one or more planner compare rules 220. In an embodiment, planner compare rules 220 specify computing a new trip when a destination associated with an event successfully resolves to a particular geographic location, and: the event starts within an hour; or if the place of the event has changed as compared to the location at which a previous similar event occurred or was held; if the start time of the event has changed; if the point of origin for a trip to the event has changed. In all these cases, issues such as traffic volume, availability of transit, and/or physical location indicate that computing a new route is appropriate or necessary.

In an embodiment, the primary state object of the planner is the planState property map. It consists of the following information.

1. Plan State Initialization (API: collectCurrentIdsForInterval)

The following planState fields are populated at the beginning of a planning run.

person—Person db object—the user for which planning will be executed forceTrips—boolean—if true, discard cache and compute new info startTime—Date object—start time of planning interval endTime—Date object—end time of planning interval planTime—Date object—planner execution start time lastPlanTime—Date object—start time of last execution run for this user travelMode—Enum—default travel mode (driving)

2. Planner Cache Lookup (API: updatePlanFromMessages)

The following planState fields are populated during planner cache lookup.

events—property map—tuples of [event uuid]/[event object]

3. Plan State Update (API: updatePlan)

These planState fields are updated via the updatePlan method.

location—Place db object—user location at plan execution time travelMode—Enum—user's preferred travel (default: driving)

events—property map—event tuples are updated if event table contains new info events[uuid].place—Place db object—resolved event location events[uuid].trip—Trip db object—computed trip info events[uuid].notification—property map—computed notification info 4. Cache Planner Output (API: updateMessagesFromPlan) The final step processes the planner output.

Persist updated event, trip and notification info as Message db objects

Delete obsolete Message objects in db

Return list of updated event ids to caller (if called via client API)

Planner implementation may be distributed among the following server internal APIs.

1. collectCurrentIdsForInterval (person, opts, callback)

When the planner is called via the client API, for instance, to update the Home Screen, this API initiates the planner run. This method calls the other 3 planner methods listed below (updatePlanFromMessages, updatePlan, updateMessagesFromPlan) to complete a single planner execution run.

2. updatePlanFromMessages (person, planState, callback)

This is the first call in a planning run. Takes a person object, an initialized planState property map, and a callback (err, planState). The planState object is populated with the cached results from the previous planner run. This consists of event, trip and notification info. The cached output is read from the db as Message objects.

3. updatePlan (planState, callback)

This method executes the comparison of cached event info, with new event info freshly pulled from the db event table. The event table contains the most up-to-date event data.

This method also computes new trips, as well as time-to-leave (notification) info. All computed data is updated in the planState.events property map, which is a field of the planState property map.

4. updateMessagesFromPlanState (planState, callback)

The final step is to persist the updated planner output to the db. For the convenience of planner output consumers within the server, the planner output is persisted as a set of Message objects. These are easily processed by the Message Digest API for delivery to mobile clients, as well as by the Notification Engine, which delivers APNS notifications to IOS clients.

In an embodiment, the planner utilizes the following server libraries:

orm-models—object model definition trip—Trip library event—Event library place—Place library person—Person library message—Message library notifications—Notifications library The planner may utilize the following server utility libraries:

utils—Server utility methods logger—Logging library haversine—Distance calculation utility The planner may utilize the following third-party modules:

fs—Node.js filesystem library util—Node.js utility library async—Open source flow control library nconf—Open source parameter configuration mgmt library In an embodiment, the message digest unit is configured to generate and send to client computing devices one or more message digests that contain one or more messages for the user of the client computing device, based on output from the trip planning unit, for sending to the client computing device for formatting and display at the client computing device in different forms, as further described herein. In this context, a message digest is a set of messages for the same user. In an embodiment, the message digest unit is configured to instantiate a message object containing data for display on a home screen of the client computing device, and to build a message digest comprising current information to be delivered to the client computing device. Each message object comprises a self-contained message or note from the server computer to the user. As further described, a message digest may comprise data that is rendered in one or more display slices in a graphical user interface of the client computing device. The app executed at the client computing device is responsible to determine an ordering for display of the display slices. In an embodiment, a display slice showing weather data is given top priority; priority also may be given to a slice associated with a next meeting.

In an embodiment, the special notification service is configured to generate and send to client computing devices one or more special or unusual notifications typically not relating to scheduled or recurring events, as further described herein. For example, the special notification service could generate and send notifications for traffic incidents that are occurring in real time, a weather notification stating that it is about to rain, notifications for special days such as days involving sports events that could cause transit delays, and notifications for holidays. In an embodiment, the special notification service may be implemented using a worker process that is listening periodically to the special data source to determine if a message needs to be sent. Notifications may be packaged in a message digest for sending to the home screen of the client computing device with a special home slice.

In an embodiment, the units described herein may use different execution models. For example, the REST server may be essentially stateless, and configured to receive and responds to HTTP requests on demand; instances of the REST server may be replicated across multiple virtual machines to provide added capacity and load balancing. The trip planner unit may be configured to execute on demand in response to HTTP requests. The event notification service may be configured as a daemon that executes once per minute, or according to another time interval or schedule.

In an embodiment, the object layer implements a schema of programmatic objects comprising primary model objects, trip model objects, and notification model objects. In an embodiment, primary model objects comprise Person, Device, Event, Place, and Address. In an embodiment, trip model objects comprise Trip, Route, and Step; in this context, a Trip may be viewed as comprising one or more Routes, each of which comprises one or more Steps. In an embodiment, notification model objects comprise Message.

In an embodiment, the configuration of the foregoing layers and elements supports extensibility. For example, the use of componentization in the library layer enables integrating third party programs, systems and functions using server computer components other than core functional code of the server computer. Configuration for extensibility facilitates new service creation. For example, new services can reuse existing library functions, new services can use the object layer to access objects, and new services can add REST APIs to permit external access to the services.

Further, the use of homeslices for display of messages and other information in the user interface of the client computing device, as illustrated and described further herein, allows dynamic creation of new content types for use in the client-side app without updating the client-side app code. Instead, the server computer may be configured to send a homeslice that contains a different content type.

The foregoing description has referred to obtaining data from third party data sources. Example third party data sources that may be used for user-specific data include calendars, contacts (to obtain location information), and location sensor sources. In an embodiment, the server computer implements OAuth support for accessing APIs that are exposed by external, third party data sources, and is configured to fetch data from external sources by issuing calls under REST APIs that are defined by the third parties. In one embodiment, calendar, contact, and user account information may be obtained from third party data sources that support such APIs and used for the purposes described herein.

Using the foregoing general architecture, embodiments may implement the functional techniques that are described herein in several ways. For example, one embodiment could provide a data processing method comprising using a server computer, obtaining from one or more non-transitory computer-readable data storage media a copy of one or more sequences of instructions that are stored on the media and which when executed using a particular user computer among a plurality of user computers cause the particular user computer to perform the functions that are described herein, using the particular user computer, alone or in combination with the server computer, and using the server computer, downloading the copy of the one or more sequences of instructions to any user computer among the plurality of user computers.

Another embodiment may comprise a computer system comprising a server computer comprising one or more non-transitory computer-readable data storage media stored with one or more sequences of instructions which when executed using a particular user computer among a plurality of user computers cause the particular user computer to perform the functions described herein, using the particular user computer, alone or in combination with the server computer, and in the server computer, stored downloading instructions which, when executed using the server computer, cause downloading a plurality of copies of the one or more sequences of instructions to the plurality of user computers.

2. Client Computer Architecture and User Interface

Figure 5:
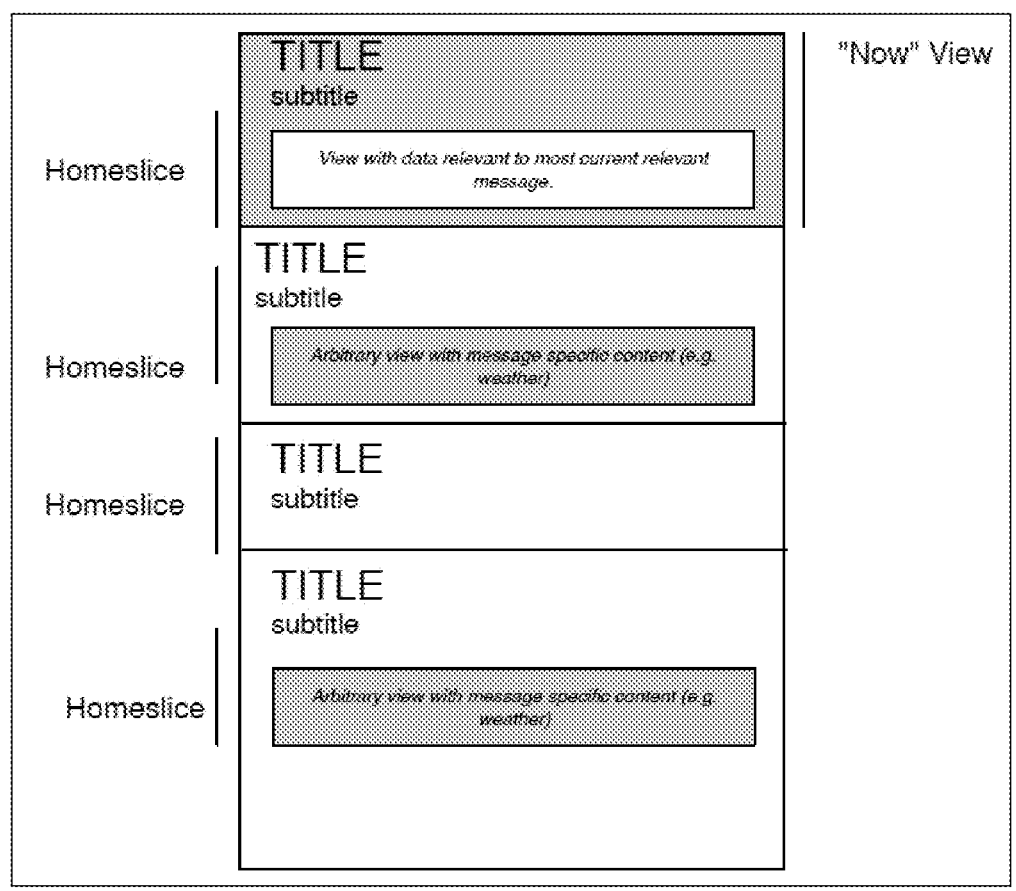
FIG. 5 illustrates an example user interface structure for a mobile device such as a smartphone.
Figure 6A:
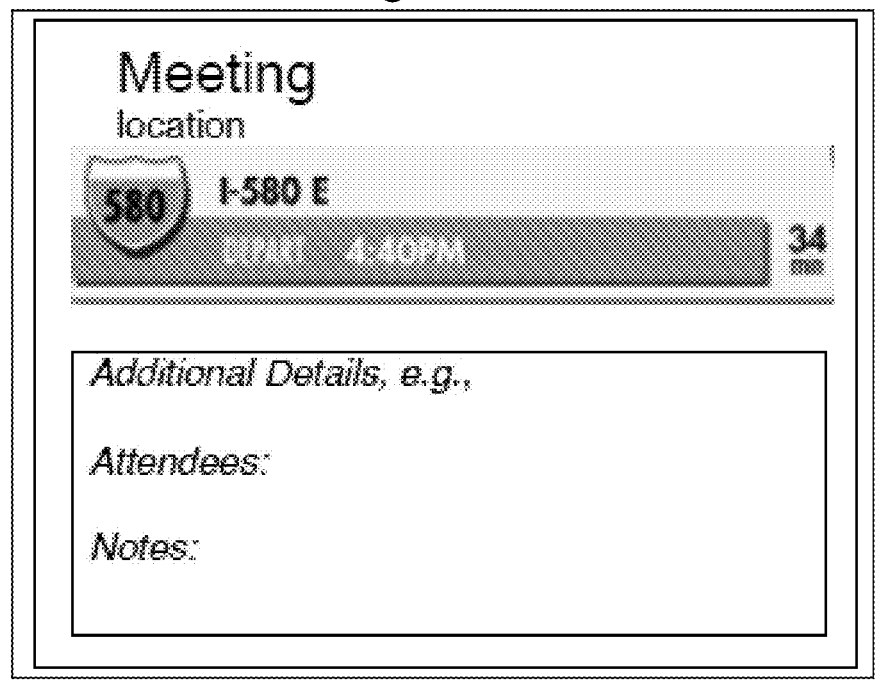
FIG. 6A illustrates an example homeslice for a meeting.
Figure 6B:
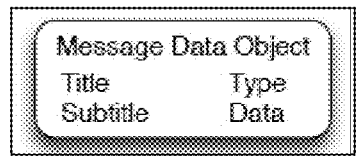
FIG. 6B illustrates example attributes of a message data object.

FIG. 5 illustrates an example user interface structure for a mobile device such as a smartphone; FIG. 6A illustrates an example homeslice for a meeting; FIG. 6B illustrates example attributes of a message data object. In an embodiment, an application program or app for a mobile computing device is configured to display a home screen comprising a plurality of homeslices, each homeslice comprising a title, a subtitle, and (optionally) message-specific content. The example of FIG. 5 depicts a user interface arrangement for a smartphone or tablet computer that includes four (4) homeslices with indicators for titles, subtitles and views of data relevant to a message or particular content.

Figure 7:
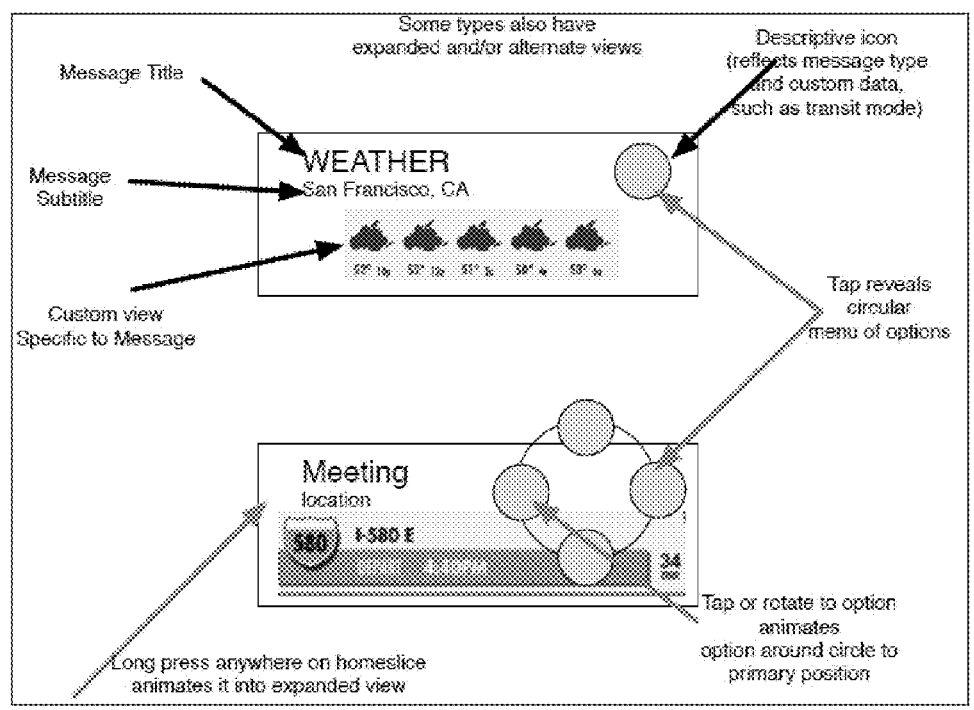
FIG. 7 illustrates example details of two example homeslices for weather information and meeting information.

Referring now to FIG. 6A, a more specific realization of a homeslice may relate to a meeting and may include a meeting name, location indicator, route time indicator, and additional details such as attendees or notes. Similarly, FIG. 7 illustrates example details of two example homeslices for weather information and meeting information. In the example of FIG. 7, the Weather homeslice includes forecast graphics and temperature data representing a custom view that is specific to the type of message that resulted in the Weather homeslice. The Weather homeslice also may include a descriptive icon that reflects a message type and custom data such as transit mode. In an embodiment, selecting (as by tapping, in embodiments on devices using a touch-sensitive screen) the descriptive icon causes displaying a circular or radial menu of options. Use of radial menus is described further in other examples herein.

Figure 8:
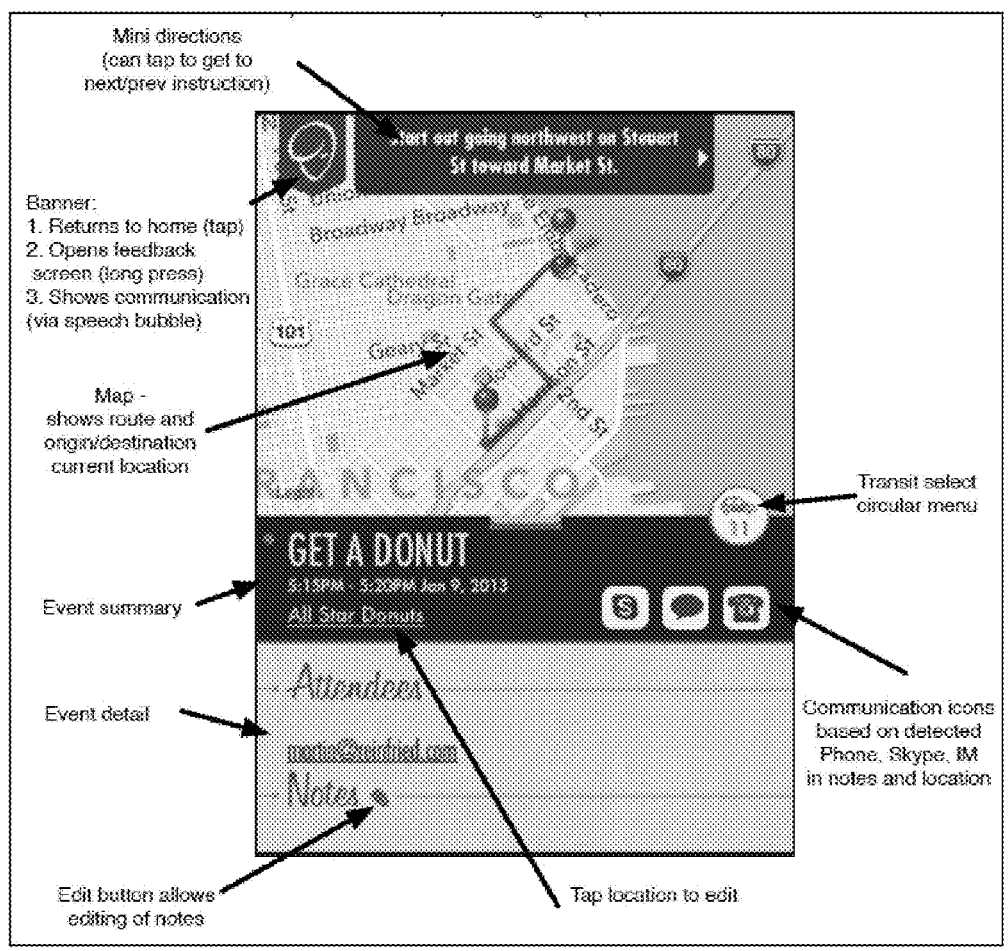
FIG. 8 illustrates an example user interface display with an event summary, event detail, map and route information.

Some types of homeslices may have expanded and/or alternate views. In some embodiments, a selection or gesture, such as a long press on a homeslice, animates the homeslice into an expanded view, if one has been defined. FIG. 8 illustrates an example user interface display with an event summary, event detail, map and route information. The example of FIG. 8 may comprise an expanded view of a meeting event. The expanded view includes a map, event detail, and notes in this example. In an embodiment, when the homeslice relates to a meeting, the map is automatically generated based upon known origin and destination points, and mini directions are automatically generated and displayed in the expanded view. In an embodiment, selecting the mini directions causes the system to display complete directions.

Some embodiments may include a home icon, depicted in the upper left corner of FIG. 8, for returning to a home screen and thus collapsing the expanded view of FIG. 8, opening a feedback screen, or showing details of received alerts, notifications or other system communications. Definitions of expanded views stored in the system may define actions that are available for regions of the expanded views such as the Edit icon associated with the Notes field of FIG. 8; in this case, a stored definition of the expanded view associates an Edit action with the Notes field.

The example of FIG. 8 further comprises a transit select icon which, when selected, causes activating a radial menu that may receive a selection of a different transit mode for use in determining the route shown on the map. One or more communication icons may be displayed in the homeslice based upon automatically detecting available services or accounts for communications services.

Referring now to FIG. 6B, in an embodiment, a message data object includes a message title, message subtitle, message type, and data. FIG. 6A represents an in-memory representation of attributes of a programmatic object representing a message. The data may be rendered as a custom view that is specific to the context of the message.

Figure 9:
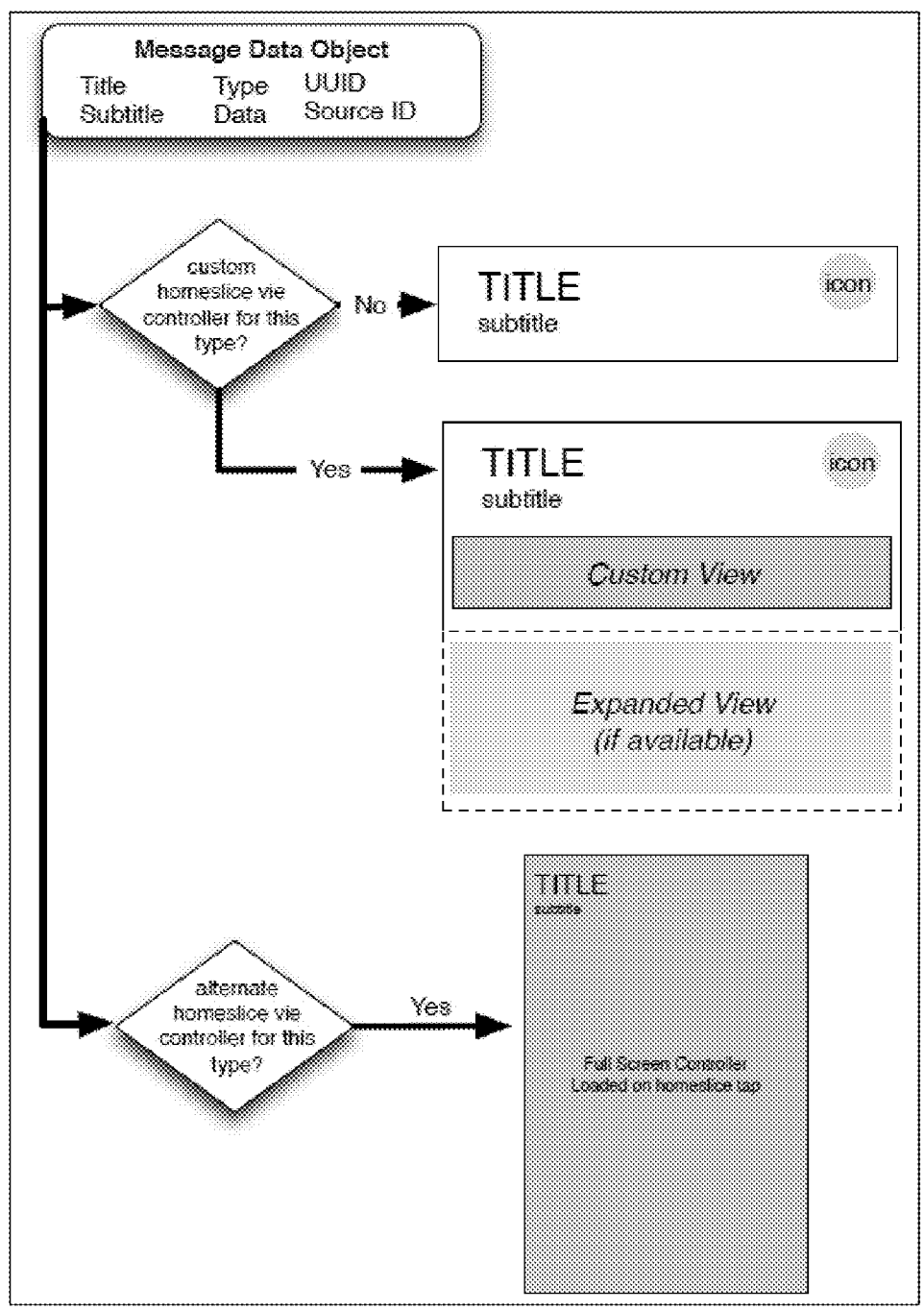
FIG. 9 illustrates a process of a message data object driving structure of a homeslice.

FIG. 9 illustrates a process of a message data object driving structure of a homeslice. In an embodiment, the form and content of a message view is determined by the app using a homeslice custom view controller that governs how to display homeslices of the current type in the custom view; in this way, different mobile client computing devices can re-implement the custom view controller in slightly different ways depending on client display capabilities or the availability of different operating system primitives for display control. As seen in FIG. 9, in response to receiving a message data object over a network connection, the client-side productivity app may determine whether a custom homeslice view controller is installed for the type of message specified in the message. If not, then a default homeslice view is used for the message data. If a custom view controller is present, then the custom view controller is invoked to generate a custom view and, optionally an expanded view. In some embodiments, the app also may test whether an alternate homeslice view controller is present and may use it to drive a full-screen view of the message data, as shown.

A homeslice may include a descriptive icon based on the message type and custom data; selecting the icon causes the app to display a circular menu of options. In an embodiment, the app displays an alternate view of a homeslice in response to user input comprising a single tap on any homeslice. The form and content of the alternative view may be determined by the app using a homeslice view controller that governs how to display homeslices of the current type.

Figure 10:
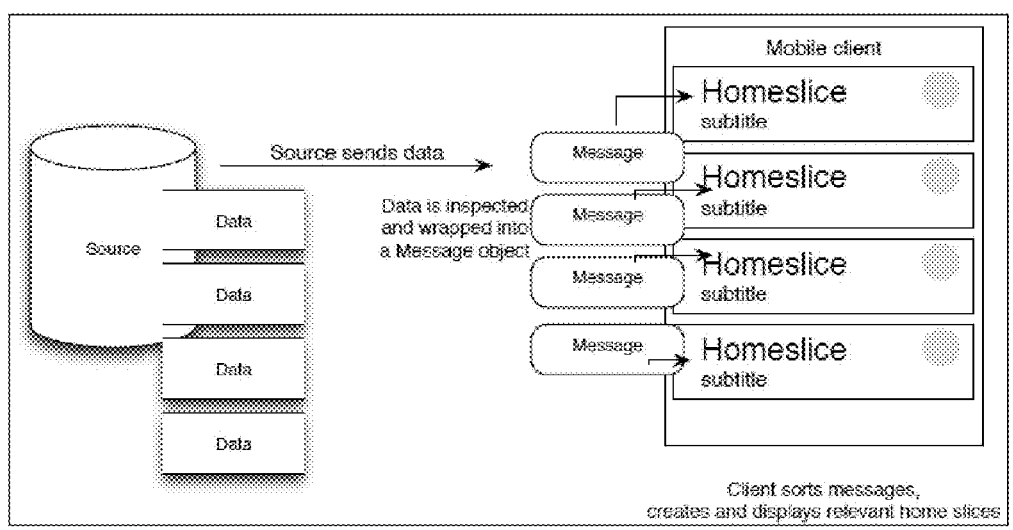
FIG. 10 illustrates a process of providing external data to a user interface.

FIG. 10 illustrates a process of providing external data to a user interface. In an embodiment, the homeslices are sorted and displayed in the user interface in reverse chronological order; in one embodiment, the most recent homeslice appears at the top of the display and contains data for the most current message that is relevant to the user. The most recent homeslice is termed the "Now" view in FIG. 5. As seen in FIG. 10, an external data source may periodically send data announcing events, and/or the server-side elements of the system may poll or obtain data and multicast the data to known mobile clients. Upon receiving data, the productivity app inspects and wraps the data into one or more message objects. Homeslice view controllers are invoked based upon the types of the messages and result in causing display of message data in homeslices in the device screen.

Figure 11A:
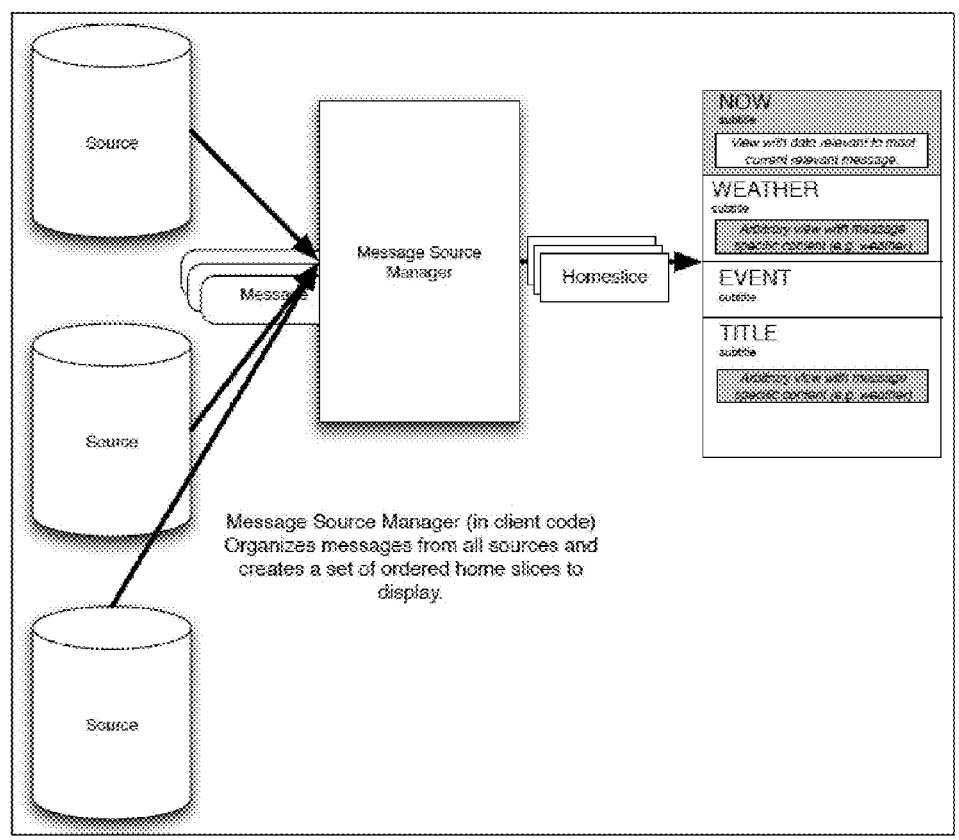
FIG. 11A, FIG. 11B illustrate a data flow using a message source manager to drive a user interface display.
Figure 11B:
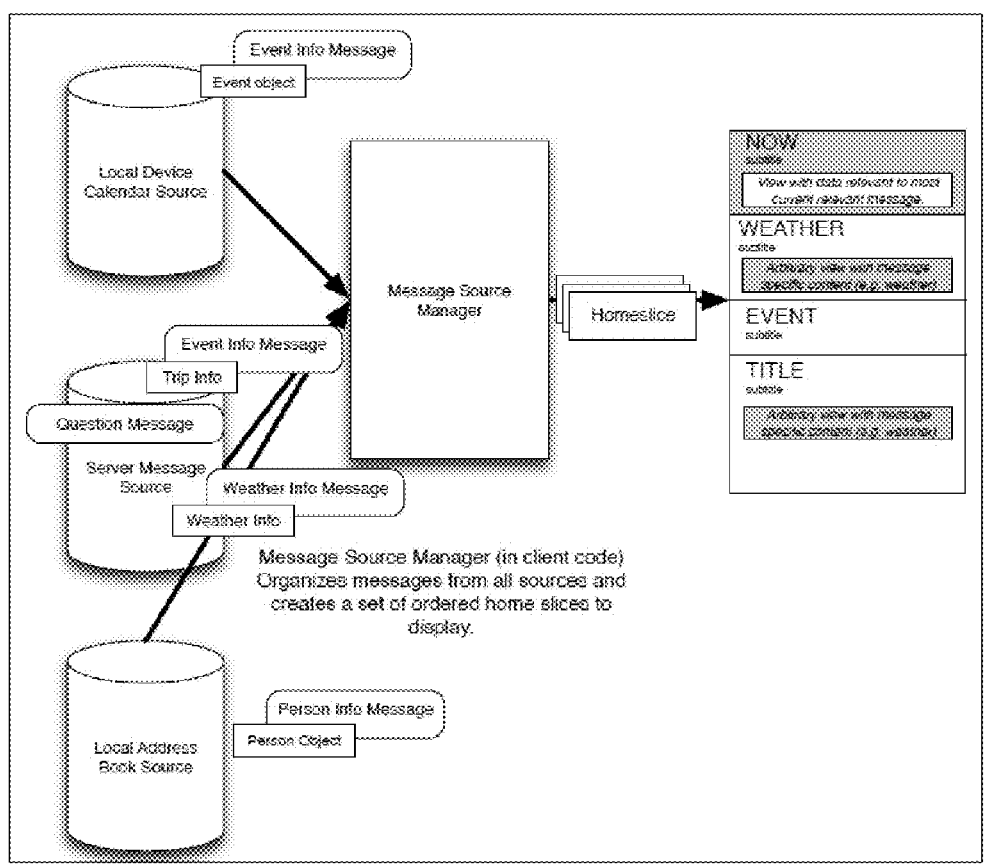

FIG. 11A, FIG. 11B illustrate a data flow using a message source manager to drive a user interface display. In the example of FIG. 11A, FIG. 11B it may be seen that the productivity app hosted on client devices may include a message source manager that is configured to receive messages, organize messages from all sources and create a set of ordered homeslices to display using the techniques previously described. Message sources may include local device calendar data, server message sources such as questions, events and trip information, local address book data, etc. Sorting may occur according to static, dynamic or heuristic rules. For example, message data may comprise a priority flag or value that the message source manager may evaluate; in this way, data indicating severe weather for a weather message could carry a high-priority flag value to result in causing the Weather homeslice to appear first in order. An example of a static sorting rule is to favor homeslices representing events when the date of the event is "today" and the starting time of the event is soon.

Figure 12:
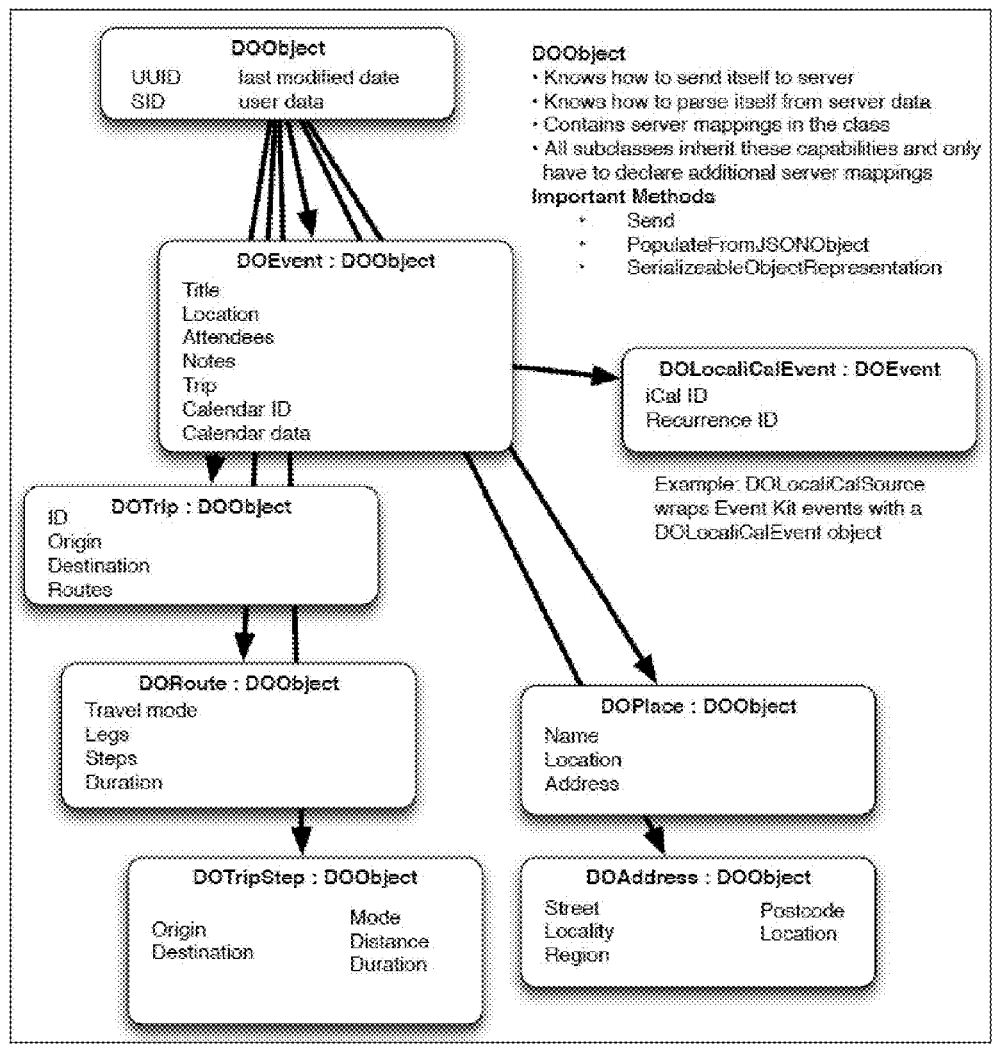
FIG. 12 illustrates an object model that may be used in an embodiment.

FIG. 12 illustrates an object model that may be used in an embodiment. Arrows indicate inheritance or dependence relationships. Text in FIG. 12 within boxes indicates attributes of objects. External text relating to the DOObject class indicates methods that the class may implement.

Figure 13:
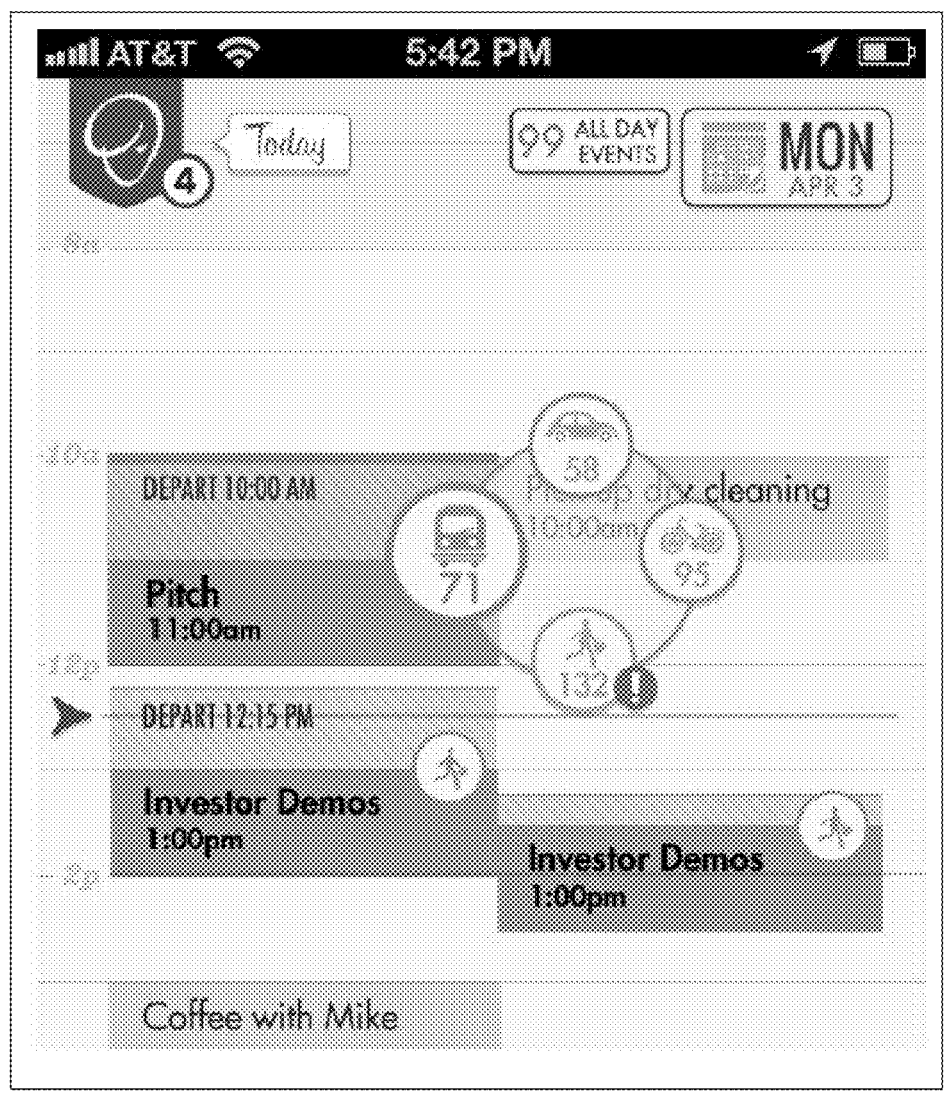
FIG. 13 illustrates a custom view of a homeslice that implements a radial menu, in an embodiment.
Figure 14:
FIG. 14 illustrates a custom display of a homeslice that includes a linearized graphical depiction of a driving route choice with icons and text indicating traffic incidents, time to the destination compared to other choices, and departure time, and includes a travel time indicator that displays travel time for getting to an event, linked to the event on the calendar but visually distinct.
Figure 15:
FIG. 15 illustrates a custom display of a homeslice that includes a linearized graphical depiction of public transit routes with icons and text indicating public transit line identifiers, walking or other transfers, waiting times, and estimated departure time and arrival time.

FIG. 13 illustrates a custom view of a homeslice that implements a radial menu, in an embodiment. FIG. 14 illustrates a custom display of a homeslice that includes a linearized graphical depiction of a driving route choice with icons and text indicating traffic incidents, time to the destination compared to other choices, and departure time, and includes a travel time indicator that displays travel time for getting to an event, linked to the event on the calendar but visually distinct. FIG. 15 illustrates a custom display of a homeslice that includes a linearized graphical depiction of public transit routes with icons and text indicating public transit line identifiers, walking or other transfers, waiting times, and estimated departure time and arrival time.

In an embodiment, a custom view of a homeslice implements a radial menu, as seen in FIG. 13. In this example, selecting a particular "time to leave" or departure event in a calendar display of the GUI of the client computing device, at the current time of day as indicated by a triangular or carat icon and a line, causes the app to display a radial menu with choices of different transit modes for the user; thus, the radial menu comprises circular icons indicating an auto, bicycle, walking, and public transit. In an embodiment, each circular icon further comprises a numeric value indicating an estimated travel time using the transit mode represented in the icon. In the specific example of FIG. 13, the user's calendar includes a carat icon at the current time of day. The user also has selected or browsed to the 10:00 AM meeting, causing automatic display of the radial menu, which indicates that if the Walking transit mode is used, the estimated travel time to reach a location associated with the meeting is 132 minutes; if the Bicycle transit mode is used, estimated travel time is 95 minutes; if the Auto transit mode is used, estimated travel time is 58 minutes; if the Public Transit mode is used, estimated travel time is 71 minutes. In this manner, each icon includes an estimated travel time for getting to an event, and the time is linked to the event; the estimated travel time is visually distinct from the event but clearly associated or attached. The travel time changes if the user chooses a different mode of transit, or if there are changes in the length of the trip. Excessive time is indicated by a "!" character to provide a visible user warning.

In an embodiment, the calendar may comprise a travel time indicator for the end of an event, alone or in association with a pseudo-event representing a recommended departure time to return or reach a tail-end location. For example, a tail-end travel time indicator may comprise a numeric estimate of the time for the user to travel back from an event to another location such as home or office. Such a return travel time estimate could be important to a user if they had a meeting at the end of the day and had no more meetings after that, and wanted to know how long it would take them to get back home or back to the office.

The radial menu is implemented using animation so that touching and moving one of the circular icons causes the menu to rotate. Rotating the menu and stopping causes selecting a different transit mode, which causes the app and the server computer to automatically compute a new trip and update the calendar with a new departure event. Further, changing transit mode may cause updating the calendar view to display, over a departure or transit event, a copy of the circular icon for the selected transit mode to indicate that the amount of time indicated for the departure or transit event is assuming the use of the transit mode that is represented in the circular icon. In the example of FIG. 13, two transit events are tagged with "WALK" icons whereas the user is in the process of selecting a different transit mode for one of the events.

FIG. 14 illustrates a custom display of a homeslice that includes a linearized graphical depiction of a driving route choice with icons and text indicating traffic incidents, time to the destination compared to other choices, and departure time, and includes a travel time indicator that displays travel time for getting to an event, linked to the event on the calendar but visually distinct. Referring now to FIG. 14, in an embodiment, a custom display of a homeslice may include a linearized graphical depiction of a driving route choice with icons and text indicating traffic incidents, time to the destination compared to other choices, and departure time. In the example of FIG. 14, the user has selected an event titled PITCH that is scheduled to occur at 1:00 PM at a particular location. The homeslice displays two possible routes; one involves using a freeway titled "Interstate 280

South" and the second involves using a surface street titled "South Van Ness." Both routes are by private vehicle as indicated by a circular icon representing a car at the right side of the display. Each route is represented by a horizontal graphical bar that illustrates a relative length of that route compared to the other route. For example, because the Interstate 280 South route is estimated as 28 minutes in duration, its bar is shorter in length than the 38-minute route via South Van Ness. Each bar is labeled with a recommended departure time: 12:32 PM for the Interstate 280 South route, for example, which is estimated to result in arrival at 1:00 PM.

Each of the route bars in this example includes one or more triangular "!" icons representing traffic incidents that may cause transit delays. The relative position of the icons along the horizontal bars indicates the relative location of the traffic incidents along the route. For example, in the Interstate 280 South route there is one traffic incident relatively early in the route, so it is displayed near the left end of the bar. The South Van Ness route has three traffic incidents at different locations along the route; one is earlier in the route and two are clustered later in the route. As a result, a user can rapidly gain an understanding of when or where to expect delays during transit along the route.

Referring now to FIG. 15, in an embodiment, a custom display of a homeslice may include a linearized graphical depiction of public transit routes with icons and text indicating public transit line identifiers, walking or other transfers, waiting times, and estimated departure time and arrival time. Data in the display may be based upon the server computer obtaining public transit schedule data from public sources made available by transit agencies. In the example of FIG. 15, three routes are shown involving different combinations of transfers and lines. As an example, the first route involves an estimated or recommended departure time of 2:25 PM on the "5" transit line (which may be a bus route, train, etc.), followed by a period of walking as indicated by an icon depicting a pedestrian, followed by a period of waiting indicated by a blank bar segment, followed by a segment indicating use of the "6" transit line, resulting in arrival at 2:53 PM. The second and third routes are similar, and differ in the departure and arrival times, routes, and duration of walking or waiting. The basis of the estimated arrival times also may be performance, arrival, or other data relating to other similar transit lines for the same transit operator. For example, the performance of a plurality of bus lines A, B, C, D, E could be used to predict delays or estimated travel times for bus line F, based on the rationale that blended performance for a plurality of lines may help predict the performance of another line in the same system.

In an embodiment, a user interface display may comprise a series of homeslices that could be viewed in the display unit of a smartphone by scrolling. In other words, with a relatively long linear series of homeslices, when viewed in the display unit of a typical smartphone or other client computing device, only a subset of the homeslices would be visible and the user would scroll the display to see other homeslices.

In an embodiment, the display includes a banner message providing a greeting and a recommendation to leave for a next appointment within a specified estimated time; this provides the end user with an immediate notification of the next departure point. Other homeslices may be formatted as previously described in connection with FIG. 5, FIG. 6, FIG. 7, FIG. 8, FIG. 9, FIG. 10, FIG. 11A-11B, FIG. 12. Various homeslices may integrate map views that graphically depict routes between events, based on predictions of user locations. Particular homeslices associated with events may include indications of transit modes, recommended departure times, and travel times; for example, the event BREAKFAST WITH CHARLIE scheduled for 7:00 AM includes a recommendation, based on a private vehicle transit mode, to leave at 6:42 AM in anticipation of a trip of 18 minutes, the route for which is displayed below the meeting title.

Particular homeslices associated with events, routes or maps also may include weather prediction data obtained from third party weather data sources. For example, below the map for the BREAKFAST WITH CHARLIE event, the user interface displays the notification "It should be 64 degrees and partly cloudy when you get there." This notification may be formed by obtaining the time of the event (7:00 AM), the location of the event, and issuing an API call to a third party source of weather data based on the time and location. Received data is parsed to obtain a temperature value and condition value and create the notification.

3. Processes that May be Configured in Various Embodiments 3.1 Use of Location-Related Data In an embodiment, the server computer may be configured to host or execute productivity logic in the form of the elements previously described with respect to server architecture, and a mobile computing device also hosts or executes a productivity app as further described herein. The productivity app is configured to periodically obtain location information from the mobile computing device and to provide the location information to the productivity logic via a network connection. For example, embodiments presume that the user of a mobile computing device has activated location services on the mobile computing device and consented to the periodic transmission of location information from the mobile computing device to the server computer. Thus, the description herein presumes that location data indicating a current location of the user's mobile computing device is continuously available.

In an embodiment, the productivity logic is configured to store and analyze a user's location history and match location history data against the user's calendar to determine if the user attends one or more meetings and if whether one or more particular meetings appear to be important. In an embodiment, the productivity app is configured to periodically push location data for the user's mobile computing device to the productivity logic, which stores the location data persistently in a data repository in association with data identifying an account of the user. For example, the data repository may comprise a location history table indexed by user account identifier and having columns that store successively recorded locations of a particular mobile computing device.

Embodiments may be configured to use location history data for a particular user to predict where the person will be later to help them plan. For example, in an embodiment, the productivity app is configured to obtain and use location history data to determine a departure destination or origin destination that is likely to be used for a future meeting. In an embodiment, the productivity app is configured to obtain and use friends' locations and history to determine likely future routes, departure or origin points.

In an embodiment, the productivity app is configured to obtain and use friends' locations to disambiguate a user's location. For example, if the user's location is identified as a particular latitude and longitude that are not associated with a known point of interest, then the productivity app may inspect contact data for the user to determine if addresses in the contact data appear to be close to the particular latitude and longitude. If a close match is found, then a particular address of a contact person in the contact data may be selected for use as the user's actual location.

In an embodiment, the productivity app is configured to obtain and use data in a user's "Things to Do" list or task list for purposes of creating and sending notifications or suggestions. For example, the productivity app may be configured to retrieve a task list and determine that the task list only contains tasks relating to purchasing; therefore, the user is likely to visit one or more retail store locations in the future and the productivity app may be configured to create and suggest a route or trip to one or more of the locations. Further, the productivity app may be configured to detect a user selecting and checking off an item in the task list and, in response, determining a location of a retail store or other location associated with the completed task, and setting the user's location in the app to match the determined location. Thus, completing a task in a task list can inform the app about where the user is currently located.

In an embodiment, the productivity app is configured to perform aggregating location data for multiple users to determine a location that is the best place, or a suitable place, to buy an item that is listed in the task list. In an embodiment, the productivity app is configured to passively use social information to enhance the ability to determine a user's location; for example, the productivity app may be coupled to programs capable of reading a social graph of a social networking service to determine that another person has performed a check-in at a particular location and identified the current user as present, and to update the user's current location in the app to match the particular location.

In an embodiment, the productivity app is configured to use the current time of day to estimate a current location of the user. For example, if latitude and longitude data from the current user's mobile device is resolved to a plurality of locations, and one location is a restaurant that closes at 3:00 PM and only has breakfast and lunch service, and the current time is 6:00 PM, then the app can eliminate that location as a potential current location.

In an embodiment, the productivity app is configured to use user location data to determine the user's work day. For example, if the user's location is relatively static over a series of days between 9:00 AM and 5:00 PM, that location could be presumed to represent a work location. Similarly, if the user's location is relatively static over a series of days between midnight and 6:00 AM, that location could be presumed to represent a work location. The presumed location values may be stored in the app or sent to the server computer for storing in association with user profile data, especially when the user has not explicitly specified work and home location values in the profile.

In an embodiment, the productivity app is configured to use location data to determine whether the user has children based upon places that the user has visited. For example, if location data for the user's mobile device indicates that the user recently visited a day care center, a park, and a toy store, the app could presume that the user has children and could use the data to inform other decisions. In an embodiment, the productivity app is configured to use location data to determine whether the user has pets based upon places that the user has visited. For example, if location data for the user's mobile device indicates that the user recently visited a pet supply store, a kennel and a veterinarian, the app could presume that the user has pets and could use the data to inform other decisions.

In an embodiment, the productivity app is configured to perform location disambiguation based on a reasonable distance value. For example, if the user's current location data is inconclusive, then the app may retrieve locations of known places that are near the user, for example, using a map data source to identify points of interest that are near the user. In response, the app may determine that the user's current location is the closest point of interest that is present in the map data, within a specified proximity, such as 100 meters, 0.1 mile, etc.

In an embodiment, the productivity app is configured to use location data of an arrival point and match the arrival point to determine a more specific location value for the arrival point. For example, if location data for a current location of the user's mobile computing device indicates that the user is at a particular brand of coffee shop, and the user's calendar contains an event or meeting that includes "coffee shop" without identifying a brand, then in response, the productivity app can determine that the event refers to the brand of coffee shop associated with the current location. The known current location then can be used for route planning to the next meeting or destination, or other purposes.

In an embodiment, the productivity app is configured to suggest locations to the user based on the user's history of events, travel, or locations. For example, the app may be configured to actively send the user suggestions of locales with certain traits based on the user's history and patterns, especially while traveling. As a specific example, if the app determines from historic location data for the user that the user commonly visits coffee shops that have Wi-Fi networking capability in the user's home area, and the app determines that the user's current location is within New York City (which is different than the user's home area), then the app could suggest locations of coffee shops within New York City that have Wi-Fi capability.

In an embodiment, the productivity app is configured to use the user's behavior history to improve the completion of locations. For example, in some prior approaches, users of mobile apps are required to perform tasks in addition to checking in at a location to be regarded as having completed visiting a location for the purpose of earning points in the app. In an embodiment, the productivity app may be influenced by the user's personal history of behavior or visiting locations to record a completion based on data indicating that the user has repeatedly visited the same location.

In an embodiment, the productivity app is configured to store preferred routes, from among a plurality of possible alternative routes, based on user history data, and optionally based on traffic information. For example, if the user can travel from home to work using any of three (3) routes of similar distance, and the user is observed always to use a first particular route from home to work, based upon location data, then the app may store the first particular route as a preferred route even though the user has not explicitly identified the first particular route as preferred.

In an embodiment, the productivity app is configured to use movement data obtained from the user's mobile device to determine a waking time for the user. For example, the app may be configured to detect significant changes in values from an accelerometer or other movement sensor within the user's mobile device, and to store a timestamp for each significant change. In response, the app may determine that if a significant change in accelerometer value occurs after a period of more than six (6) hours of no changes, then the time of the significant change represents a waking time. Additionally, in an embodiment, the productivity app may be configured to use the waking time value, in combination with detecting a significant change in the mobile device's location value, to determine how much time the user takes to leave the house; the resulting value may be useful in recommending the use of transit systems, routes, or changes in patterns.

In an embodiment, the productivity app is configured to use a value of the mobile device's location, or an identity of a city in which the mobile device is located, to determine a likely transportation mode for purposes of route planning. For example, if the mobile device is known to be within Los Angeles, then the app may set the default transport mode to driving with a personal vehicle. In contrast, if the mobile device is known to be within London, then the default transport mode could be set to public transit.

In an embodiment, the productivity app is configured to use location data or city data to determine relevant information to show to the user. For example, if the location of the mobile device is known to be Los Angeles, then weather report data indicating heavy rain could be given greater urgency or made the subject of a special notification, whereas the same weather report for Atlanta might be treated as an ordinary notification.

3.2 Use of Financial Transaction History Data

In an embodiment, the productivity app is configured to use financial transaction history data associated with a user or mobile device to determine patterns of activity by the user and to inform other process decisions. Financial transaction history data may be obtained by using API calls to obtain data from a third party financial transaction service such as MINT, with user permission or registration. Alternatively, financial transaction history data may be obtained from a payment platform app that is hosted on the same mobile computing device.

For example, the productivity app may be configured to determine that the user periodically performs payment transactions directed to a particular telecommunications company; in response, the app can store data identifying that telecommunications company as preferred or default in searches for Wi-Fi hotspots. Further, in an embodiment, the app may be configured to obtain data relating to past purchases to determine likely current or future locations of the user. For example, if the app determines from past purchase transaction data that the user has purchased food at a sushi bar on one Friday per month for the past six months, the app may respond by generating a suggestion to eat at the same sushi bar on a future Friday. Similarly, the app may use the lack of a transaction for a particular location within the user's financial transaction history data to eliminate a candidate location from among a plurality of possible locations in the process of disambiguation of a location. For example, if the user's financial transaction history data indicates that the user has many transactions for Alpha Coffee Shops but not for Espresso Express Coffee Shops, and the user's current location is near both, then the app may select that the user's current location is Alpha Coffee Shop.

In an embodiment, the productivity app is configured to detect what type of credit card the user uses, and to deliver one or more advertising messages based on which card the user uses. Card type data may be obtained from a third party financial transaction data source, or from data indicating a card that is registered with the app for use in purchases. In an embodiment, the productivity app is configured to use financial transaction data to determine user profile, likes/dislikes, recommendations, and brand preferences.

3.3 Suggestion Processes

In an embodiment, the productivity app is configured to communicate suggestions or recommendations to the user. For example, the app may determine from location data and from the user's home location that the user is in a city that the user rarely visits. The app may also determine based on the user's calendar that the user has no meetings or events scheduled for the next 2 hours. In response, the app may retrieve suggested locations to visit in the city and provide notifications or homeslice data containing the suggestions or recommendations. Further, in an embodiment, the notifications may be generated dynamically based upon detecting changes in the user's location within the new city or other base location. For example, the app may detect that the user is near a landmark location, or near a location that is recommended in travel guidebooks, a point of historic interest, a tourist attraction, or other point of interest; in response, the app may generate and send a notification suggesting that the user should visit the specified location.

In an embodiment, the productivity app is configured to generate and send notifications or homeslice data at the beginning of the day to suggest travel options based on relative locations of meetings and final destinations for the day. For example, based on obtaining calendar data and determining the relative locations of meetings or events in the calendar, the app might recommending using a personal vehicle to reach a first meeting but then using public transit to move from the first meeting to a second meeting. Such a suggestion could occur, for example, in response to determining that the first meeting is far from the user's home location but the second meeting is close to the first location and in a place that has public transit service.

In an embodiment, the productivity app is configured to suggest a change in the current transportation mode based upon a variety of factors, values and data sources such as weather data, traffic data, delays in public transit, where the next meetings are and how the user can reach them, based on large events such as sports games or matches, or based on the occurrence of a natural disaster or other significant event. For example, the app may be configured to receive data feeds from third party data sources pertaining to any of the foregoing cases and to recognize alerts or significant events encoded in the data feeds; in response, the app may recommend changing the current transportation mode for moving from one location to another location.

In an embodiment, the productivity app is configured to obtain context information about a location that has been determined for an upcoming event and to use the context information to determine a transportation mode to use for a route to that event. For example, the app may be configured to determine that a location for an event is a four-star restaurant, or a location associated with a high cost of admission or high prices; in response, the app may change the transportation mode for a route to that event to personal vehicle rather than suggesting a bus route.

In an embodiment, the productivity app is configured to detect the entry of a new event in a calendar and the location of that event, to determine whether the user has sufficient time using any available transit mode to reach the new event from the current location or from a location of an immediately earlier event, and to suggest an alternate meeting locations if the user has insufficient time to reach the new event. In one embodiment, detecting entry of a new event and responding as described above may be performed immediately after a new event is created and saved.

In an embodiment, the productivity app is configured to generate and deliver notifications comprising reminders of birthdays or other milestone events based on obtaining and analyzing recent call history, text messaging history, or profile data that indicates which contact persons are important to the user.

3.4 Use of Transit Data and Travel Data

In an embodiment, the productivity app is configured to create and send notifications that provide reminders, time values, or countdown values to inform a user when to exit a public transit vehicle. For example, the app may be configured to determine a current location of the user's mobile computing device, to compare the current location to a destination associated with a bus stop, station stop, or other exit point for a public transit route that the user is using, and to display a time or countdown to inform the user that the stop is approaching.

In an embodiment, the productivity app is configured to change or reroute transit connections based on real-time data obtained from third party data sources such as transit agencies or independent aggregators of transit data. For example, a third party data source may receive a notification from a transit agency that a bus, train, other vehicle or route is delayed or unavailable and may make the notification available via an API call to the third party data source or through an active data feed. After obtaining such a notification, in response, the app may determine a new route for the user and may form and send a notification message to the mobile device announcing the new route.

In an embodiment, the productivity app is configured to obtain transit data relating to arrival times for public transit routes or trips, and to facilitate a display in the mobile computing device of incoming transit arrival times. For example, the app may be configured to detect from device location data that the device is at a transit station and the location of the device has not changed in several minutes. In response, the app may generate and send notifications that announce the next arrival times for trains, buses, or other transit vehicles to the current location. Additionally or alternatively, the app may generate and send notifications of arrival times or departure times that are most likely to result in the user timely arriving at a next meeting or event. Each such notification may specify one or more transit lines that are likely to cause the user to timely arrive at the next meeting or event.

3.5 Use of Other Data Items

In an embodiment, the productivity app is configured to detect and analyze touch gesture input on the display unit of a mobile computing device to assist in determining a known location or unknown location of a user. For example, the app may determine that during a map display of a particular location, the user enters gestures that move the map view rapidly past the particular location; in response, the app may update stored preference data to indicate that the user does not recognize or favor the particular location. Additionally or alternatively, the app may be configured to detect the duration for which the user views a particular location on the map, and in response to detecting a relatively long duration, the app may update stored preference data to indicate that the particular location is known.

In an embodiment, the productivity app is configured to detect and respond to a user deviating from a normal calendar pattern to provide reminders ahead of time. For example, if the user's home location is in Alpha Town and user calendar data most often includes events located in Alpha Town, Beta City and Gamma Town, all of which are in close proximity, but on the current day the user has a meeting scheduled in Delta City that is distant from Alpha Town, the app may provide departure reminders earlier in time for the Delta City meeting than those that are provided for Alpha Town meetings.

Further, the app may be configured to detect that the user has scheduled a meeting that is unusually early in the morning compared to other meetings that the user has scheduled in the past. In response, the app may generate and send a reminder to the mobile device on the day before the early morning meeting, rather than just before the meeting.

In an embodiment, the productivity app is configured to detect current weather conditions and to provide reminders in response to changes in weather conditions, based upon receiving data from third party data feeds. For example, on a particular day the weather data may indicate that the weather at the user's location in the morning includes rain, and later in the day the weather data feed may indicate sunny weather at the later time or forecast for the next day; in response, the app may generate and send a reminder to the user specifying that the user should take home the user's umbrella or other foul-weather gear. Additionally or alternatively, the app may generate and send such a reminder only in response to detecting that an umbrella or other foul-weather gear is at the user's location, based upon detecting signals from RFID tags, NFC transceivers, or other sources. To facilitate such a process, the umbrella or other foul-weather gear may have an RFID tag or other item attached that can communicate with the mobile computing device for the purpose of detecting the proximity of the item. The same techniques may be used to provide reminders to take or leave other items such as keys, tools, apparel, or any other item that can carry a detectable tag or generate a detectable signal.

In an embodiment, the productivity app is configured to receive user input specifying an actual departure or arrival time of the user and the mobile computing device in connection with a particular event. For example, performance of the app may be enhanced by providing the app with explicit data input indicating that the user is actually at a particular meeting, event or location. In one approach, the app is configured to automatically create and store sub events or pseudo-events that relate to arriving or departing at an earlier time than an actual event.

In an embodiment, the productivity app is configured to shade, in the graphical user interface display, entries in a calendar item that identify particular participants who are known to be expected to arrive late. For example, for a meeting that involves three (3) participants, the app may create and store an event record for the meeting that identifies the participants by name or other identifier, and may display the participants' names in a GUI display of the event record. Assuming all three (3) participants are using the app, the server computer will receive periodic updates about the current locations of devices of all three (3) participants. The app may be configured to retrieve location data and current transit modes for the devices and to compute routes using those transit modes from the devices' locations to the meeting location. Based on the route computations, which include arrival time values, the app may determine that one or more of the participants will be late to the meeting.

In an embodiment, the productivity app is configured to determine when to show weather information selectively based upon specified conditions. For example, the app may be configured to display weather information in the GUI, or provide weather notifications, only when the weather is anomalous, or only when the weather is adverse (rain, snow, sleet, unusual wind, etc.), or only at certain times of day such as not at mid-day.

3.6 Facilitating Connections to Other Services

In an embodiment, the productivity app is configured to facilitate connections to other services that involve non-computer, real-world tasks or interactions. For example, in one implementation, the app may detect that based on the current time, the user's current location, and the time and location of the next meeting, the user is likely to be late for the meeting; in response, the app may generate and send a message or notification offering to place a call to a car service or taxi service or to create a booking record for a car service or taxi service that will result in initiating car service or taxi service. An example of a car service that can accept creation of booking records by electronic means is UBER.

In another implementation, the app may inspect the user's task list, identify specified tasks that are capable of completion by known service providers that have been configured in the system, and automatically connect to and generate task records or requests with third party known service providers. An example of a service provider is TASKRABBIT.

In an embodiment, the productivity app is configured to detect that based on the current time, the user's current location, and the time and location of the next meeting, the user is likely to be late for the meeting; in response, the app may automatically notify other attendees who are scheduled to be at the same meeting by sending notifications or messages to indicate that the user will be late. Similarly, the app may be configured to detect based on rapid changes in location data over time that the user appears to be in transit and, in response, generate and send notifications or messages to other attendees stating that the user is en route to the meeting. In still another embodiment, the app may be configured to determine, based on current location data for the user's mobile device, that the user has arrived at a meeting location and, in response, to generate and send notifications or messages to other attendees stating that the user has arrived. This embodiment may be useful, for example, when the meeting premises are large or have parking lots, security facilities or other features that will require the user to expend time to move from an entry point to a specific meeting room or precise location.

In an embodiment, the productivity app is configured to automatically manage location sharing bounded around calendar events. In one aspect, location sharing may comprise sharing the location of the user's mobile device passively with meeting attendees so that to the attendees can determine an estimated arrival time and communicate with other attendees about the arrival time. For example, the app may be configured to accept a configuration setting from the user indicating that the user consents to having the user's location shared with other attendees of all meetings, or for a particular meeting. The other attendees are presumed to be using instances of the same app on their mobile devices so that they can obtain shared location data from a server computer with which all the app instances communicate. In that arrangement, the server computer may periodically send updates about one user's location to the other users who are recorded as attendees at the meeting.

In an embodiment, the productivity app is configured to cause placing simulated phone calls directed to the user to remind the user about important events such as a time to leave for a meeting. For example, the app may be configured to determine that a particular meeting is important and, in response, to request a server computer to place a call to the user's mobile computing device using a third party calling service. In a variation of this function, the app may be configured to cause the server computer or the third party calling service to place a call to the user's mobile computing device that enables the user to exit a meeting on the pretext of accepting an important call from a real person.

In an embodiment, the productivity app is configured to receive and evaluate a signal from a microphone of the mobile computing device and to determine whether the signal, which represents ambient sound near the user, indicates that the user and device are in a particular location or a particular kind of location. For example, software-implemented sound recognition and classification processes may be used to sample ambient sound via the microphone and to determine whether the user and device appear to be at a club or restaurant as opposed to an office location, at home, or in other locations. The resulting determination may be used to assist the app in disambiguating locations.

3.7 Trip Calculations

In an embodiment, the productivity app is configured to perform calculations of routes and trips between one physical location and another, based on using map data and other data sources and techniques as described in detail in the following sections. In one approach, the app is configured to select and suggest a mode of transport based upon determining whether a trip from a first point to a second point involves a reasonable travel distance for a particular mode of transit. For example, the app may determine that the trip is 50 miles and, in response, suggest only a personal vehicle transit mode or a heavyweight or interurban rail transportation mode, but not a public transit mode where the route would require bus service. Alternatively the app may determine that the trip distance is 4 miles and could suggest both personal vehicle and public transit using a variety of service types, and even walking depending on the available time to make the journey.

In a related feature, whether a particular distance between points is reasonable may be determined differently for each user. For example, stored transit history data for a particular user may indicate that the user usually walks from home to work, based on stored location data and transit times for moving from home to work. If the distance from home to work is 2 miles, then the app may configure itself to determine that other trips of 2 miles or less also should include a suggestion of walking as the transit mode and provide walking directions.

In another related feature, the productivity app is configured for using flight time to determine reasonableness. For example, the app may determine that using all available transit modes, the time to travel from the first point to the second point is 10 minutes by rail, 20 minutes by bus, 16 minutes by personal vehicle, and 105 minutes by walking. In response, the app may ignore and not offer the walking transit mode in making recommendations for transit modes.

In another related feature, the productivity app is configured for using the user's history of location and velocity to determine what travel mode to recommend. For example, if stored history data indicates that the user regularly travels from a first location to a second location at high velocity, as determined by comparing timestamp values for departure and arrival in association with the location values, then the app may recommend a transit mode that will achieve a similar velocity for a future trip between the same points or similar points. In another related feature, the productivity app is configured for using data representing velocity and route to determine which public transit route should be recommended to complete a trip from a first point to a second point.

In another related feature, the productivity app is configured for using estimated time to complete parking as part of the estimated time to travel from a first point to a second point. For example, data from third party data sources may be queried to obtain the level of occupancy for a parking garage that is at or near a destination location, and the level of occupancy may be used to determine an approximate amount of time that will be required for parking. An example data source is SFPARK.ORG. That time value may be added to a transit time value attributable only to driving time between the points to form a more accurate estimate of point-to-point transit time.

In another feature, the productivity app is configured for using past behavior to calculate padding time for starting and ending a trip. For example, based on stored data indicating the location of the user's mobile computing device at different times, the app may determine that the user normally needs ten (10) minutes to walk from a particular meeting location to a car or to a transit stop. In response, the app may add "10" to the computed transit time attributable just to driving or using other transit vehicles to form a more accurate estimate of point-to-point travel time.

In another related feature, the productivity app is configured for using past behavior of the user or mobile computing device to modify travel estimates. For example, based on comparing timestamps and location data, the app may determine that the user typically drives fast. In response, the app may modify a particular travel time estimate for a route that involves driving to be less time than for other users. Additionally or alternatively, the app may determine based upon past events, locations and arrival time that the user is usually late in arriving at a particular location; in response, the app may modify a particular travel time for a route to the same location or a similar location by increasing the estimated travel time. Consequently, the app may account for travel delays that may have occurred in the past due to road construction for which data is not available in the map data source, or because the user typically drives or moves more slowly than others, or because transit vehicles on a particular route do not appear to adhere to a schedule or have encountered system failures or other delays in the past.

In another related feature, the productivity app is configured for using location information to help determine the likelihood of tardiness. For example, the app may use map data and the location of a particular destination point to determine that congestion is likely to occur, causing delays; a destination in the middle of Manhattan is likely to have a far different estimated arrival time than one located in Liberal, Kans. The nature of the location also may indicate a likelihood of late arrival.

In another related feature, the productivity app is configured for using traffic and other information to suggest optimal commute times. In this feature, the app is configured to review third party traffic data sources on a historical basis to determine, for example, that the greatest congestion or likelihood of accidents along a route occurs between 6:00 AM and 7:30 AM. In response, based on stored data describing such occurrences, the app may recommend using the route only after 8:00 AM.

In another related feature, the productivity app is configured for using parking availability, parking violations or citations issued in the area of a parking location, and/or price of parking spaces to suggest one or more particular parking lots, garages or other locations. For example, the app may be configured to obtain data from a third party data source that indicates the location, occupancy, and price of parking lots or garages, and to obtain law enforcement data or crowd-sourced data relating to the geographical and time distribution of the issuance of parking violations in or near a destination location of the user. In a related feature, the app may use the foregoing data to modify estimated travel time values that are determined as part of trip computation activities; for example, the app may determine that a parking garage representing the best value and having the greatest likelihood of vacancy may require an 8-minute walk to reach the destination location, based on map calculations that compare the destination location to the parking garage location, and therefore the app may add "8" to the estimated time for point-to-point travel for the trip. In still another related feature, the app may be configured to send a notification, in response to determining that the recommended parking location involves using coin-operated parking meters or other coin-operated devices, to suggest that the user should bring coins or currency appropriate to the devices.

In another related feature, the productivity app is configured for detecting a change in velocity, based on input from an accelerometer or GPS unit in the user's mobile computing device, to determine where the user parked and the time elapsed to reach a destination from the parking location to provide a better estimate of when to leave from the destination. For example, if the input indicates rapid movement consistent with driving, followed by a stop, followed by an interval of six (6) minutes before the destination is reached as indicated by location data for the mobile computing device, then the app can determine that added transit time of six minutes should be added to any time estimate for movement from the destination to a next meeting, event or destination. In this manner, the app may track device movement and intelligently update other travel estimates to account for actual user movements from place to place and to include time intervals that are experienced in practice but not possible to obtain directly from map data.

In another feature, the productivity app is configured to generate and send one or more notifications, messages or homeslice indications to instruct or suggest the user when to leave for a meeting based on traffic, travel time, mode of transport, weather, parking time or typical delay time. In each case, time measurements or data input associated with the user arriving at a first location, event or meeting may be used to pad or modify the estimated transit time, and therefore the recommended departure time, for moving from the first location, event or meeting to a second location, event or meeting. For example, if the user experienced traffic congestion while arriving at the first location, the app can assume that the user will experience the same level of congestion while departing from the first location and can increase the estimated time for transit to the second location and/or modify the recommended departure time to be earlier. As to travel time, if the app determined that the user's actual travel time from one location to the first location exceeded the app's prior estimate for that route, then the app can increase the estimated time for transit from the first location to the second location or modify the recommended departure time to be earlier. As to mode of transport, if the app has recommended the use of public transit for moving from the first location to the second location, but the app determines based on GPS or accelerometer data that the user actually used a car to move from home or work to the first location, then in response the app can modify the route from the first location to the second location to assume that the car will be used, and/or modify estimated transit time or recommended departure time. As to weather, if the app had pre-computed a route from the first location to the second location at the beginning of the day, when weather forecasts were favorable, but the app retrieves updated weather data later in the day and determines that conditions are adverse, then the app can recalculate the route or change the recommended transit mode to a different mode to account for the changed conditions at that time. As to parking time or typical delay time, as noted above, if the app has determined that after parking the user required additional time to move from the car to a final location, then the app may incorporate that same amount of additional time into other estimates for moving to a next meeting.

In another feature, the productivity app is configured to use data indicating a previous velocity of the user to guess where the user may be. For example, assume that for a first time period during transit from a first location to a second location, the app has computed a route and estimated a transit time of 20 minutes, but 15 minutes into the trip, the app ceases to receive location updates from the mobile computing device due to a loss of connectivity by Wi-Fi or cellular connection. At this point, the app may have determined that the user's velocity over the past 15 minutes was approximately 30 MPH. In response, the app may determine that the velocity is likely to continue to the end of the trip while decreasing slightly, and based on that estimated velocity, the app may compute a travel distance and location along the route at which the user is expected to be actually located. The estimated actual location then may be used in other app functions to generate or send notifications or messages.

In another feature, the productivity app is configured to use interruptions in GPS service in combination with previous locations to determine the context of the mobile device or its updated location. For example, if the app has determined that a route from a starting point to a destination includes a segment that is within a tunnel, and the app has determined that the mobile device has left the starting point and traveled along the route, then a subsequent cessation of GPS signal to the device or the loss of location updates from the device may be presumed to indicate that the device is within the tunnel segment. Further, in a related feature, the productivity app is configured to interpolate location data for the mobile device when actual location data is missing or is not received. For example, in one embodiment, dead reckoning techniques may be used.

The absence of location updates from the mobile computing device also may be used in the app to cause automatically generating notifications or messages to other users of the app or of other systems. For example, if the app has determined that a route from a starting point to a destination includes a segment that is within a tunnel, and the app has determined that the mobile device has left the starting point and traveled along the route, then a subsequent cessation of GPS signal to the device or the loss of location updates from the device may cause the app to respond by generating one or more notifications to other users of the app, or email messages, indicating that the user of the device may be late, has stopped in transit, etc. This feature may be useful when the mobile device is in a location at which an outbound call cannot be placed to notify others of a travel delay. This function may be performed alone or in combination with third party data feeds comprising travel advisories, and/or based upon similar updates received from multiple other users of the app who are on similar routes or using the same mode of transit. For example, if the server computer can determine that a significant number of app instances have ceased providing location updates and all are associated with transit on the same route that includes a tunnel, the server computer could conclusively determine that a transit delay on the route has occurred.

In another feature, the productivity app is configured to determine the reliability of a particular mode of transit or a particular route, to rank available modes of transit from best to worse, and to use the ranking to recommend what route to take or what mode of transportation to use. For example, on-time arrival data for routes or transit systems, obtained from third party data sources or feeds, may be used to inform route or mode recommendations.

In another feature, the productivity app is configured for guessing multi modal transport and routes. In various embodiments, the app is configured to estimate that a route may use two or more modes of transit, such as first using a private vehicle mode in one route segment, and later using a public transit mode in a second route segment. Prediction or estimation of transit modes also may include selecting among different public transit operators when multiple operators are present in the same general geographic area. For example, embodiments may be configured to determine that a particular rapid transit operator is more likely to be used by the user than a particular bus line operator. Embodiments may be configured for dividing a trip into segments and considering available transit modes, operators or lines for each of the segments independently. Further, the app may be configured to recomputed or re-estimate multiple transit modes in response to detecting a change by the user among particular modes of transport or vehicles. In an embodiment, the app may be configured for dynamically rerouting to better routes and/or causing the user to be rerouted close to preferred locations, as indicated in stored user profile data. For example, the app may be configured to seek to reroute the user in proximity to a particular restaurant, bar or coffee shop that the user is known to visit regularly.

In an embodiment, trip calculation may be performed using the following techniques, which permit the system to calculate a trip at its most atomic levels so that, as better data from external sources is obtained, or predictions improve based on algorithmic efficiency, behavioral information, or user-supplied preferences, the trip calculation process can be updated. For purposes of this embodiment, the following terms may have the following example definitions:

Trip—The total time and route(s) taken to get from the origin to the destination. Made up of one or more routes Route—The navigation directions on how to get from an origin to a destination. A route can have one or more segments Leg—Like a segment, usually used in flights, the part of a route from a single embarkation point to the next disembarkation point Segment—The part of a route between an embarkation point and a disembarkation point Segment time component—The time components of a segment, broken down by: (1) Time to get to an embarkation point; (2) the actual in-transit time; and (3) the time to leave a disembarkation point Transit—The use of mass transportation systems to get from one point to another; this could be via rail, road, sea, or a combination of the three Embarkation Point—The point at which a traveler starts a route or segment of a route and changes or ends a specific form of transport Disembarkation Point—The point at which a traveler ends a route or segment of a route and changes or ends a specific form of transport Routing—The act of calculating how a traveler will get from their origin to their destination through several waypoints, based on their form of transport Routing Mode—This is what is used by the routing services to determine route information—Walking, Biking, Transit, or Driving Transport Mode—The form of transport a traveler tales for a trip, such as by foot, cycle, road vehicle, rail vehicle, water vehicle, or air transport.

In an embodiment, to calculate a trip, the system obtains the route and estimated trip time from routing services, such as Yahoo! Maps. The calculation is based on the real or predicted times for getting to and from a destination via the chosen transportation mode (Walking, Biking, Transit, or Driving). Besides traffic incidents or other in-transit delays—which are usually accounted for in the trip calculation—each trip may have other factors that make the basic trip calculation inaccurate. For example, a person may need some time at the beginning to leave the originating destination and walk to your car. At the tail end of the trip, extra time may be needed to park and then walk to your destination. With public transit the trip calculation times are based on the transit schedules. Some public transit systems are more predictable than others. In addition, there are other factors to consider. A person may need time to get to the transit embarkation point. Also, the person may not always want to arrive just as the bus or train arrives—there is some wait time at the beginning of the trip, as well as at each transfer point.

Input for Calculating Route and Time to Destination may include:
 Predicted or current origin
 Destination
 Routing Mode (Driving, Transit, Walking, Biking), based on prediction, choice, or user preferences
 Event Start Time
 Event End Time
 Predicted or explicitly asked input. Client needs/does not need parking directions at end of route. Client is driving or biking to embarkation point of transit route. Or client is driving or biking from disembarkation point of transit route Output may comprise:
 Route(s) (directions to destination)
 Estimated duration for route, which is the returned value from the routing service
 Estimated duration for total trip, which includes any pads in addition to the route time
 Calculated time to leave in order to arrive at destination on time A trip may have more than one segment. For example, a commuter may drive to the train station (Part 1, with driving, parking, traffic, incidents, walking), then get on the train (Part 2, with transit), and may take a shuttle from the train station (Part 3, with "chauffeured" driving, traffic, incidents), and finally walk from the shuttle stop (Part 4, with walking). In an embodiment, the system determines a mode of transportation for each segment. Embodiments perform trip calculation to include things that add time to the trip, such as getting started on the trip (for example, getting to a parked car) or parking at the end of the trip, and offer multi-modal choices (such as Driving+Transit).

Calculating Trip Time may comprise:
 Get trip routing and time calculation for origin-to-destination
 Review trip route: Decompose trip into segments; Identify types of segments; If segment is of an identified special type and requires a different mode than originally calculated, calculate trip time for that segment
 Some other parts of the trip may also need to be recalculated
 Add one or more padding time values representing other additional time needed based on rules for trip or for each segment The system should try to find out the following information from a client about their trips:
 If driving, will the client need to find parking that is not directly near the destination?
 Transport and transit preferences of client
 When a route involves transit: Which transit waypoint is the initial embarkation point? How will the client get to the initial embarkation point? How will the client get from the disembarkation point to the destination?

Rules for Identifying Segments may comprise:
The system may determine that a particular waypoint is significant enough that it can change the mode of transportation or that a particular mode is unreasonable or less likely (e.g., origin to train station, origin to airport, airport to destination).
 A mode of transportation changes (Driving->Walking; Driving->Transit)
 A vehicle change or transfer (Train->Train; Train->Bus; BART->MUNI)
 Getting to a transit embarkation point. The system needs identify how a client is getting to a transit embarkation point, such as a train station, bus stop, or airport. If driving to a transit embarkation point, this needs to be calculated separately, as most trip calculations from major services do not take this into account
 Getting from a transit disembarkation point: The system needs identify how a client is getting from a transit disembarkation point, such as a train station, bus stop, or airport
 At the end of a driving trip, a client needs to park—parking should be considered a segment
 When there is a significant wait at any waypoint
 When a new waypoint is created that diverts the user from the original destination: To get gas, To park, To stop for refreshment.

Example of a Trip Decomposed
 Event: Meeting at Crunchfund
 Origin: Home in East Bay City
 Destination: Meeting at Crunchfund, 500 Townsend Street, San Francisco
 Mode of Transport: Driving
 Segments: Segment 1: Drive to San Francisco near Crunchfund building and look for parking; Segment 2: Find parking and park car: Segment 3: Walk from parked car to Crunchfund building and into office Segment Breakdown A trip is made up of one or more legs, or segments. Each segment has the following main time components. It's important to decompose the sections of the calculation so that we can make adjustments to each based on predicted or explicit behavior.

1. Start of Segment Time

The time it takes to get to the actual embarkation point. This will often be zero when the segment is in the middle of a trip. Actions that contribute to this are:
 Getting to parked car
 Waits for transfers
 Navigating exits such as lobby, elevators
 Exiting a house or other residence
 Exiting a place of work
 Exiting a meeting that is in a building
 Exiting a parking location such as a lot or garage.

2. In-Transit Segment Travel Time

The time it takes to get from point A to point B based on the calculated distance and estimated speed of travel. This has a few components:

- Actual travel time from point A to point B
- Delays due to traffic congestion on the way there
- Real-Time notification
- Predicted traffic from data service
- Predicted traffic based on same day of week/same time/day of queries
- Delays due to traffic incidents, weather, or other factors
- Need real-time notification for these 3. Parking Time Segment. Specifies the amount of time that is expected to be incurred to park a vehicle when the mode is Driving. The parking time segment may be treated as a regular segment with start-time, in-transit, and end-time, or could be part of the end time of a segment. Using parking time as a separate is useful since parking data will be of varying accuracy.

- Park a vehicle on the street or in parking lot or garage
- Paying for parking
- Leave a parking lot or garage
- Get to your destination from parking (shuttle, walk, pedicab)

4. End of Segment Time

The time it takes to get to the end of the destination. Actions that contribute to this are:

- Walk into a house
- Get to your place of work
- Get to meeting in a building (through a lobby sign-in, elevator ride)
- Disembark time
- Getting off of plane or bus
- Leaving building
- Leaving train station
- Factors to consider for trip calculation
- If destination is within 50-100 feet of originating location
- If the trip is over x miles away
- If client is driving; need to consider parking, both routing to a parking spot and time needed to park
- The system needs to monitor traffic conditions and incidents at all times and warn users if they change the trip
- The system needs to monitor the movement and location of her client—even though she sends a notification for them to leave, if the client does not leave in time she may need to prompt them again, and even find an alternate route or way of getting her client to an event (for example "You are now very late to this meeting, but an Uber will get you there on time . . . ")
- Other factors to consider for trip calculations
- Availability of Carpools/HOV lanes when there is traffic
- Motorcycles can usually use HOV lanes at all times. Knowing that a user rides a motorcycle is something we could include in preferences, or as an explicit ask. This obviously could change the time for a trip; perhaps we reduce the traffic delay by some amount? Maybe there is some data already out there for this?
- Availability of Express Toll Lanes (ETL) and High Occupancy/Toll (HOT) when there is traffic
- Cars with automatic toll payment systems (like Fastrak) for roads with toll lanes
- Chauffeured driving services (taxi, Uber, Lyft, limo, shuttles)—need to consider the wait time needed to begin trip
- For ZIPCAR, rental car, and other shared vehicle services, need to consider getting to the vehicle
- Sometimes a client will not want to arrive at the start time of an event
- Calculating a "return trip" for the user so they can return to their original location Current Algorithm for Time Calculation:
- Adds 8 minutes to every trip longer than X minutes Current Rules
- If trip is less than x miles away
- If trip is more than x miles away Alternatives for Time Calculation. In an embodiment, the system obtains a time calculation for the entire route, as computed by the services that the system decides to use. The actual decomposition if a trip into segments is not critical. In an embodiment, the planner may have sections as follows:

1. Start-up Time Calculation
   a. If trip is less than 8 minutes +0
   b. If trip is between 8 and 15 minutes +2
   c. If trip is greater than 15 minutes +4

2. In-Transit Time Calculation
   Driving
   a. Time calculation for trip (ideal conditions) +X
   b. Traffic Delay Time Calculation +X(traffic)
   Sources for traffic delay time calculation may include: Estimated (from third party service); Real-Time; Adjustments for other factors such as HOV, Motorcycle, FasTrak, By Day of Week/Time of Day.
   c. Incident Reporting Delay Time Calculation +X(incident)
   Transit
   a. Wait time for transit +5
   b. Time calculation for trip (ideal conditions) +X
   c. Adjustments for known transit systems +MUNI
   Biking
   a. Time calculation for trip (ideal conditions) +X
   Walking
   a. Time calculation for trip (ideal conditions) +X 3. If Driving, Parking Time Calculation
   a. If parking time not available, then consider:
   i. Looking for parking or navigation to lot +P(find)=4
   ii. Parking vehicle +P(park)=1
   iii. Other rules +P(rules)
      1. Location
         a. If garage +3
         b. If lot +1
         c. If street
            i. If suburban +4
            ii. if urban +12
      2. City/Region buffers
      3. Time of day buffers
   iv. Time to leave parking location +P(exit)=1
   v. Time from parking to destination +P(dest)=2

4. End Time Calculation
   a. if trip is less than 8 minutes, +1;
   b. if trip is 8-15 minutes, +2;
   c. if trip is 15-30 minutes, +3;
   d. for every 30 minutes after that, +2;
   e. buffer for "arriving early" +2.

In an embodiment, the system may provide functions to analyze trip and decompose into segments. Initially this could comprise adding a parking segment to driving routes based on user answers to the system's questions. In an embodiment, this function may comprise identifying a possible multi-transport trip. In an embodiment, there may be a function for calculating each segment's travel time: Start Time Calculation; In-Transit Time Calculation; Parking Time Calculation; End Time.

In an embodiment, to improve traffic prediction, the system should attempt to get estimated traffic delay for an event on the same day and time as the expected event so that traffic patterns are similar, if the system is not receiving predicted traffic delay for that day and time. In an embodiment, a first priority would be to get actual real predicted traffic; second would be to get similar traffic predictions for exact day of week and time as the event; third would be to get traffic for same time but different day, if event was less than seven days. The system could also be checking expected traffic delay as the event nears and update the trip calculation accordingly Examples of Default Values and Rules for Travel Time Segments All of the default values should be built into functions and the defaults should be updateable without modifying code. None of the default values or rules should be hard-coded. They could be modified by: Direct update; Update by user to default values based on preferences; The system might explicitly ask a user a question would change a value; Update based on user behavior; Update Based on real-time information.

Most driving trips will be the returned routing time (X) plus the start and end pads. StartPad+X+EndPad If it is a transit route it will be StartPad+(X+TransitWaitPad) +EndPad. In an embodiment, the system adds the wait time pad because most calculations form services will try to route to the embarkation point with very little wait time before the train leaves.

If there is parking at the end of the route, the calculation may be: StartPad+X+P+EndPad (if parking calculation is done from parking data) or StartPad+X+[P(default)++P(rules)+P(exit)+P(dest)]+EndPad.

1. Start of Segment Time
  a. This is the time that it takes to get to the actual embarkation point
  b. If trip<x minutes 0
  c. If trip>x minutes +4
  d. If you have to get to a garage parked car +10
  e. If Transit, add a default wait time for train +5
  f. If Transit, time to get to embarkation point +T(embark)
Services may include walking to embarkation point time already in their routes. But for multi-modal travel—until we have multi-transport mode support, we should ask client how long it takes to get to the embarkation point and route the transit from there, adding this user-supplied estimate 2. In-Transit Segment Travel Time (Driving/Transit/Walking/Biking)
  a. Estimated time under ideal conditions +X
  b. If Driving, Traffic delay as returned from service +Y
  c. If Driving, Incident delay as returned from service +Z
  d. If Transit, add a default expected delay, so +T(delay)
  e. In-Transit Delay Pads (if not included in a, b, c)
    i. Based on querying real-time traffic for same day of week and time or same time
    ii. Based on vehicle: walking, biking, driving, transit
    iii. Based on time: if trip<10 minutes, 0; if trip 10 to 30 min, 5; if trip 30 to 50 min, 10.

3. Parking Time
  a. If driving, estimated time from Parking Data+P
  b. If parking time not available: Driving–Default+P (default); Other rules +P(rules) Parking Time may be adjusted: 1. By city/region; 2. If garage; 3. If lot; 4. If street; 5. If suburban.
  c. Time to leave parking location +P(exit)
  d. Time from parking to destination +P(dest)

4. End of Segment Time
  a. If trip<x minutes +1 b. If trip>x minutes +4

Mode Lists
Routing Modes
  Local Travel: Walking, Biking, Driving, Transit
  Long Distance Travel: Long Distance Train, Long Distance Sea Travel, Air Travel
Transport Modes
  Foot: Walking, Running, Manual Scooter/Skateboard
  Cycle: Biking, Chauffeured Cycling; Pedicab!
  Road: Car, Van, Truck, Motorcycle, Chauffeured Driving; Carpool, Taxi, Ride service, Limo, Shuttle, Bus
  Rail: Train, Subway, Tram, Light rail
  Boat: Ferry, Boat
  Air: Helicopter, Airplane Examples of Trips Decomposed into Segments With Calculation of Segment Times By Segment Parts From Home (CV) to BART (CV) via Driving to Office via Transit
Drive-Park-Walk-Transit-Walk
  Segment—Drive to Station Parking Lot: In-Transit—10; End—0
  Segment—Park: Start—0; In-Transit (Find Parking in Permit Lot)—2; End—0
  Segment—Walk to station: Start—0; In-Transit—2; End—1
  Segment—BART to SF: Start (Wait for train)—5; In-Transit—33; End (Disembark, leave station)—2
  Segment—Walk to Office HQ: Start—0; In-Transit—10; End (stairs)—3

From Home (CV) to Office via Driving
Drive-Park-Walk
  Segment—Drive to parking lot @ 2nd & Howard near office HQ: Start—1; In-Transit—35; In-Transit Delay (Traffic)—15; In-Transit Delay (Incidents)—0; End—0
  Segment—Park: Start—0; In-Transit (Find parking)—1; End (Pay for parking, exit)—2
  Segment—Walk to Office HQ: Start—0; In-Transit—1; End (stairs)—3

Examples of Trips
Commute from Home in Suburbs to Work In City via Transit: 1. Walk to car from home; 2. Drive car to train station parking lot; 3. Park car at train station; 4. Walk to embarkation point; 5. Wait for train to arrive; 6. Wait for train to leave; 7. Ride train to stop near destination (disembarkation point); 8. Disembark train and leave station; 9. Walk to destination address; 10. Walk, take elevator to office/suite Commute from Work In City to Home in Suburbs via Transit: 1. Leave office and building; 2. Walk to embarkation point; 3. Board train; 4. Wait for train to leave; 5. Ride train to home train station; 6. Disembark train and leave station; 7. Walk to parked car; 8. Drive car to home driveway or parking spot; 9. Walk from car to home.

Taxi to Airport for Departing Flight: 1. Walk to taxi/Wait for taxi; 2. Ride taxi to airport; 3. Depart; a. Check-In; b. Security line c. Walk to gate; d. Wait time at gate e. Get on airplane; 4. Fly to airport near destination; 5. Disembark airplane; 6. Walk to baggage claim; 7. Get baggage; 8. Walk to taxi; 9. Ride taxi to destination.

Ride Bus to Work: 1. Leave home; 2. Walk to bus stop; 3. Wait for bus; 4. Ride bus to stop near destination; 5. Walk to destination address; 6. Walk, take elevator to office/suite Drive from Home and Park: 1. Leave home; 2. Walk to car in driveway; 3. Drive to parking near destination; 4. Walk to destination Parked Car to Drive and Park: 1. Walk to parked car from origin; 2. Drive to parking near destination; 3. Walk to destination Bus with Transfers to Train & Shuttle: 1. Walk to bus stop near origin; 2. Ride bus to stop near transfer; 3. Walk to transfer transportation (train); 4. Ride train to stop near destination; 5. Walk to shuttle; 6. Ride shuttle to stop near destination; 7. Walk to destination ZIPCAR in City: 1. Walk to ZIPCAR; 2. Drive to Destination 3.8 Importance Determinations In another feature, the productivity app is configured to use data indicating the relative importance of a particular event or meeting in performing certain determinations and in carrying out other functions. For example, in one embodiment, the productivity app is configured for obtaining data indicating the size of estimated attendance at an event, and marking the event as important or unimportant based upon the retrieved data. Additionally or alternatively, the app or server computer may obtain data for the calendars of multiple different app users to determine whether an event that has been calendared by one user appears to be important.

In another feature, the productivity app is configured to use calendar, location, and contact data, obtained from other apps or third party data sources or feeds and associated with the user of the app, to determine which people associated with a meeting or event are most important at a given time. In various embodiments, the data may be used to assist the app in determining whether a particular received email is important. For example, if a newly received email message is from a person in the user's contact file and associated with a plurality of prior events or meetings, then the app may determine that the message is more important than others received from senders with whom the user has never held a meeting. Further, if such a sender or person is an attendee scheduled for a future meeting, then that future meeting may be automatically marked as more important based on the presence of the attendee. Embodiments may inspect the surname of a message sender or a person associated with a meeting to determine if the surname matches the user's name, to identify family relationships and therefore important persons.

In a related embodiment, the app may identify a host individual who is associated with a meeting or event and determine that the host is more important than other persons, at least within a particular time frame; in response, the app may prioritize received email messages based on the importance of that person. In an embodiment, prioritization of people associated with meetings or events may be based upon records for the user for prior phone calls, email, text messages and other communications. For example, frequent communication of the user to another person using any such mechanism may be interpreted to indicate that the person is important with respect to a particular event, or in general. In response, the app or server computer may mark records of events or meetings as important or may mark records in contact files identifying persons as important.

3.9 Dossier Functions

In another feature, the productivity app is configured to obtain and manage personal context data for the user of the app based upon data relating to the user obtained from other sources. For example, in one function, information from social graph data sources may be obtained and analyzed. In another function, the app may use the last known meeting date with a particular person to determine what kind of information to show in displays of the app on the mobile computing device. For example, if the app determines that a particular meeting is the first meeting between the user and another person, in response, the app may display one or more pictures of the other person, obtained from social graph sources, results of image searches using search engines, or online photo storage sites, to assist the user in identifying the other person. The process of selecting images may include using facial recognition to find image overlaps such as images that both the device user and the other person are in. Additionally or alternatively, the app may display one or more articles or online documents obtained from internet searches or public information sources, such as WIKIPEDIA, relating to or describing the other person.

Similarly, in response, the app may display a list of one or more common interests of the user and the other person. Additionally or alternatively, the app may display indications of mutual friends based on social graph data. Additionally or alternatively, the app may use location history of the current user and the other person to determine whether the user and the other person have visited the same places, or certain places with regularity, and to provide messages indicating a particular place visited by both as an indication of potential common interest.

In a related feature, if the app determines that the user and the other person have met before, but a time interval between a current meeting and a prior meeting is a long time (for example, several months), then in response, the app may display one or more life events for the other person based upon data retrieved from social graphs or other sources. In another feature, if the app determines that the user and the other person have met before, but a time interval between a current meeting and a prior meeting is a short time, then the app may be configured to publish in a homeslice a copy of TWITTER messages (tweets) for the other person based upon assuming that the level of interest between the persons is greater.

In another feature, the productivity app is configured with sentiment analysis logic to use status updates of the other person, obtained from social graph data sources, and to analyze patterns in language within the status updates to determine potential life changes and mood associated with the other person, for reporting or summarization to the current user prior to a currently scheduled meeting. For example, the app may determine that status updates or posts of the other person are outside a normal range of sentiments for the other person and may provide a message indicating that the context or mood of the other person may be changed.

In another feature, the productivity app is configured to determine the context of a scheduled meeting based on relevant correspondence. For example, the productivity app may inspect the calendar data for a user, consider a particular meeting or event, identify the attendees for the event, read prior email messages or text messages stored in the mobile computing device that include both the current user and one or more of the other attendees, and perform semantic analysis to determine whether the scheduled meeting is a work meeting. In a related feature, semantic analysis of related correspondence may be used to disambiguate the persons associated with a particular meeting. For example, assume that a particular meeting on a user's calendar indicates "Lunch with Taylor," and the user's contact data contains records for three (3) persons named Taylor. Based on semantic analysis of recent correspondence involving the user, the app may determine that the user has recently and frequently corresponded with Taylor Smith but less frequently or less recently with Taylor Jones and Taylor Johnson. In response, the app may retrieve and display data relating to Taylor Smith based on deciding that "Lunch with Taylor" is likely to be Taylor Smith.

In another feature, the productivity app is configured to perform prioritization of email, events and/or tasks based on historical information about meetings. For example, the app may be configured to inspect records of prior meetings and currently scheduled meetings, identify the participants in the meetings, and prioritize email, events or tasks associated with those participants with higher priority values than for other persons who do not appear in prior meetings or scheduled meetings.

3.10 Cross-Referencing Other Resources

In another feature, the productivity app is configured to perform cross-referencing of other resources for purposes of performing app functions. For example, the app may be configured to detect that calendar items in a user's calendar represent air travel itineraries or plans; in response, the app may obtain on-time arrival data from third party data sources, correlate the obtained data with flight identifiers in the user's calendar, and determine whether to pad estimated travel time from one location to another location to account for variables such as late arrival, the need to pass through airport security checks, size or distance of parking lots or terminals, or related data. In another feature, destination data relating to air travel may be used to select other destination information including images, articles, or maps for display in the app user interface in association with the calendar item.

In another feature, the productivity app is configured for detecting keywords in a calendar entry to automatically launch relevant apps. For example, the app may be configured to inspect calendar items to identify keywords such as SKYPE, GOTOMEETING, or others and to launch apps for those services automatically at or near the time of the meeting. In this manner, an event scheduled as a SKYPE meeting in the calendar can trigger automatically launching a SKYPE app on the mobile computing device to reduce the time and functions necessary for the user to perform to join the meeting.

In another feature, the productivity app is configured to monitor email messages to detect meeting changes or additional notes. For example, the app may be configured to inspect email messages to detect keywords such as RESCHEDULE or CHANGE THE TIME or CHANGE THE DATE and, in response, to prompt the user to change the date, time, or location of a specified meeting that matches other content in the email messages. The app also may be configured to inspect email messages to detect content to associate with a particular calendar event as a note or attachment; entire email threads of multiple related messages may be associated with events, or selected content may be inserted into a calendar item as a note or attachment. Opening the calendar item includes displaying the text of the note with or without a list of attendees.

Further, in an embodiment, the app may be configured for attaching notes and documents to an event on a file-sharing service for attendees to share. As an example, the app may be configured to cause automatically creating a folder in a network-based file storage service, such as DROPBOX, BOX, etc., and to store one or more notes, documents, email threads, message excerpts, or other materials for use by persons attending a meeting. Examples include In an embodiment, the app is configured to permit the user to specify attachments within the app. Additionally or alternatively, the app and server computer may be configured to receive email messages that are addressed to a general mailbox for the server computer and contain attachments for association with a user account and an instance of the app.

In another feature, the productivity app is configured for looking at email timestamps and matching the timestamps against calendar event creation date values and meeting date values to find relevant correspondence. For example, in any of the foregoing features involving inspecting email correspondence, text messages or calls, timestamps of the inspected items may be compared to calendar event creation date values and meeting date values to select, as relevant, only items that are near the creation date values and earlier than the meeting date values. In an embodiment, the app may be configured for inspecting call history records to identify meeting call bridge numbers that have been used for similar meetings in the past.

3.11 Scheduling Meetings

In another feature, the productivity app is configured to perform automated meeting scheduling functions. For example, in one embodiment, the productivity app is configured for using an automated assistant to help schedule meetings using personal profile data gathered both passively and explicitly. Personal profile data that may be gathered explicitly may include configuration settings that the user enters to indicate available times in a calendar and busy times in a calendar, preferences relating to meeting locations, meeting duration, or other values. Personal profile data that may be gathered passively may include items such as apparent waking time of the user, daily commuting time, typical travel velocity or transit mode, or other values. One or more of these values may be used to automatically generate and send, or respond to, meeting schedule requests, events or other calendar items.

In another feature, the productivity app is configured for creating a profile of the user's common types of meeting locations, meeting importance, place of work, and modes of travel. The profile may be used within the app, or communicated to an external or different app, system or person. For example, the profile may be communicated to another individual to assist that person in scheduling meetings that include the user.

3.12 New Event Creation

In another feature, the productivity app is configured to automatically create one or more new events in the user's calendar, either within the app, in another app on the mobile computing device, or in a networked online calendar application or service. For example, in one embodiment, the app comprises a calendar entry mechanism that suggests places, attendees based on history from prior events. As an example, if calendar entry mechanism could determine that the user held a lunch meeting with Sandy Smith on the last Friday of August and October; in response, the calendar entry mechanism could generate and send a notification suggesting to schedule a lunch meeting with Sandy Smith on the last Friday of February.

Additionally or alternatively, the calendar entry mechanism may be configured to suggest locations for meetings based on previous similar meetings. Continuing with the prior example, the app may be configured to determine that the lunch meetings with Sandy Smith both were at Joe's Restaurant and, in response to suggest holding the next lunch meeting with Sandy Smith at Joe's Restaurant, or to suggest holding another scheduled meeting at Joe's Restaurant with another person who is known to have an office near Joe's Restaurant.

In an embodiment, the calendar entry mechanism may be configured to automatically determine a conference room location based on the current location(s) of the user. For example, if the user has scheduled two separate meetings at the same building or campus, the app may retrieve online data identifying conference rooms within the building or campus and may suggest the use of particular conference rooms for the meeting.

In another feature, the productivity app is configured to generate and display a notification about the forecasted weather for the destination location of a meeting. Generating and displaying a message may occur at the time that a meeting or event is created and entered into the calendar. For example, in response to a user creating a meeting or event, or in response to the calendar entry mechanism automatically creating a meeting or event, the app may be configured to insert in the meeting or event record a notification such as "It should be 58 degrees when you get there." In various embodiments, weather messages may appear in the home screen or within a calendar item in the user's calendar.

In another feature, the productivity app is configured to determine the presence near the mobile computing device of one or more other mobile devices that are running the same app and therefore have compatible communication capabilities or information sources. For example, the app may be configured to turn on a Bluetooth radio or other near-field radiofrequency telecommunication interface of the mobile computing device and to attempt to pair with or communicate with other devices in proximity that have compatible interfaces. In response to identifying one or more other mobile devices that are in proximity, information identifying the users or devices may be requested from the compatible instances of the app and used, for example, to record data indicating whether all expected persons actually are present at a meeting, to identify potential good networking opportunities at a conference or event, or to create instant or serendipitous meetings.

In another feature, as described above the productivity app may be configured for predicting an originating location for a meeting based on one or more intervening meetings, known behaviors of the user such as sleep and wake patterns, and/or predicted locations of the user such as home or work locations. Further, in an embodiment, the app may use data indicating that originating location to help calculate trip times.

In a related feature, based upon permission data or configuration data, a first instance of the app may be configured to request from a second instance of the app one or more calendar records for the calendar data of the user of the second instance of the app. For example, a particular user may configure the app to permit sharing the user's calendar data with other instances of the same app. In response to obtaining calendar data for another user, the app may automatically analyze the received calendar data and help the other user or app instance plan one or more future meetings based on comparisons of the calendar data for the two users.

In an embodiment, the app is configured with a calendar event creating mechanism that includes a continuously vertically scrolling calendar display. Selecting a calendar icon causes the app to display a portion of a calendar for the current day, with an icon, bar or other graphical element indicating the current time. In response to receiving user gesture touch input indicating scrolling up or down, the display is regenerated to scroll the calendar vertically upward or downward in a continuous manner so that dates in the past or future may be viewed along an infinite timescale.

In an embodiment, the app is configured to enable a user to change the origin associated with a route; this function enables the user to provide feedback and correction if the app has guessed the wrong origin for a meeting in comparison to the user's actual location, or if there is incomplete information in your calendar. In one implementation, a user may view a map view in a homeslice, select an origin icon, and receive a dialog that prompts the user to enter a different origin specification.

In an embodiment, the app is configured to provide notification via telephone such that a call processor coupled to the server computer can call the end user's mobile computing device, for the purpose of assisting users who tend to ignore vibration or sounds emitted by a smartphone. In such an embodiment, the user might see an identifier of the service in the caller identification data for the device, and might receive an automated voice announcing. "Time to leave for your meeting".

Figure 16:
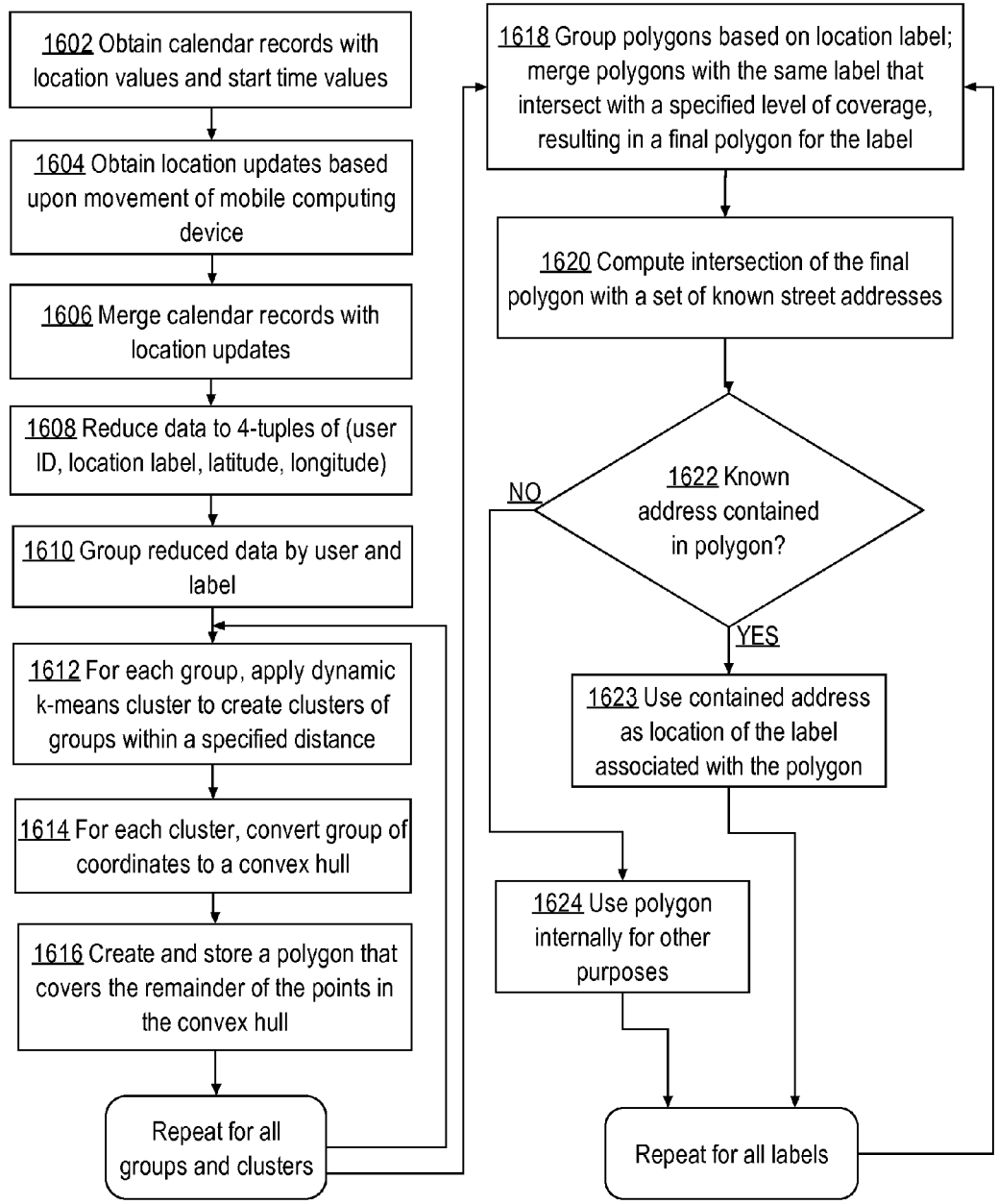
FIG. 16 illustrates an embodiment of a process to determine locations of places that lack map coordinate data.

3.13 Determining Locations of Places that Lack Map Coordinate Data Using Alpha Shapes Approaches In an embodiment, the server computer and the productivity app are configured to cooperate to determine location data, such as latitude-longitude coordinates, for places for which conventional map coordinate data is unavailable. Examples of such places include conference rooms inside buildings. FIG. 16 (5) illustrates an embodiment of a process to determine locations of places that lack map coordinate data.

As described above, the server computer and the productivity app may maintain, or integrate with, calendar records that may include a location field and a start time. In block 1602, the process obtains a plurality of calendar records with location values and start time values. For example, a calendar record may comprise Location="Jackson" and startTime="10 Jan. 2013 14:00". Calendar records may be obtained from the productivity app, or from a calendar application of a mobile computing device, by the server computer listening for events using the Event Kit API. Typically the location value is user-specified at the time that a calendar entry is created, for example, at the time of booking a meeting or accepting a calendar item that was created and transmitted by another user as an invitation.

At block 1604, in an embodiment, the server computer also obtains a plurality of location updates that the mobile computing device posts based upon movement of the mobile computing device. Each update includes a device identifier or user identifier, a timestamp indicating a date and time of the update, and position data such as a latitude-longitude pair, which may be based upon GPS receiver data or location values obtained from a WiFi access point with which the mobile device has become associated or connected. For example, in one embodiment that uses APPLE IOS, the server computer listens for updates provide via the Significant Location Change (SLC) protocol, or background operations. With SLC, the SLC service of APPLE IOS wakes approximately every five (5) minutes and publishes an event with GPS-based location data if the then-current location of the mobile computing device is different as compared to a previous location. In other words, as the mobile computing device moves from location to location, when the SLC service executes, if the current position of the device based upon GPS is different than a past position, then the SLC service generates an event that is consumable by other apps on the device.

At block 1606, the calendar records are merged with the location updates so that each calendar record is bound to the measured location of a user at the time of the event. For example, if the server computer has stored a calendar record with Location="Jackson" and startTime="10 Jan. 2013

14:00", and the server computer obtained an SLC update at time 14:05 specifying particular Latitude-Longitude values, then those location values may be stored in association with the calendar record. In an embodiment, the start time of each calendar record is compared to the timestamps associated with the location updates, and the latitude-longitude values from the location update that is closest in time after the start time of the calendar record are selected and stored in association with the calendar record. As a result, one or more of the calendar records become associated with apparent locations of the mobile computing device at the approximate actual time of the event indicated in the calendar records. The merged data may be stored in a database table that is configured for the purpose.

At block 1608, the merged data is then reduced to 4-tuples consisting of (user identifier, location label, latitude, longitude). Data reduction may comprise copying, from a first database table that stores calendar records and location updates, only the values specified for the 4-tuples into rows of a second database table. Thus, the second table will have columns only for (user identifier, location label, latitude, longitude).

At block 1610, the reduced data records are then grouped by user and label; conventional sorting techniques keyed to user identifier and label value may be used to accomplish the grouping. At block 1612, for each group a dynamic k-means cluster is applied to create clusters of groups within a particular distance of one another. The distance between clusters may be specified in configuration data; an example distance value is 250 meters. Block 512 may comprise the following sub steps, in one embodiment:

1. A particular number of candidate centroids are selected from the set of data. "Centroid," in this context, refers to a point around which a polygon is constructed later, and recognizes the fact that multiple visits to the same particular location are likely to result in the mobile device generating slightly different (latitude, longitude) location values. The number of candidate centroids may be specified in configuration data. Centroid values may be computed on-the-fly as part of this sub step, or may be pre-computed in a discrete pass over the reduced data before the clustering process starts.

2. All data are compared to the candidate centroids, and differences between the candidate centroids and the location values in the reduced data are determined.

3. If the closest centroid value in the candidate centroids is within the particular distance, then the data are assigned to that centroid; otherwise the data are added to the candidate centroid set.

4. New centroids are calculated for the mean of all data assigned to a centroid.

At block 1614, once each cluster has been identified, the groups of coordinates are converted to a convex hull with defined rejection rates for individual points that would enlarge the convex hull by a defined amount without adding in another point. The effect is to identify outliers from among the coordinate points in the clusters; any data points that are omitted in the construction of the convex hull are dropped or ignored, and at block 1616, a polygon covering the remainder of the points is created and stored.

At block 1618, after all polygons for all users have been created, the polygons are grouped by the location label to result in a set of polygons that are associated with a particular location across multiple users. For each group of polygons having matching location labels, all polygons that intersect with one another with greater than a defined amount of coverage are merged into one another. The result is a more precisely defined final polygon for a particular label, based upon input from a plurality of users that thus reflects a shared concept of the location of the label. This approach improves accuracy of the shape estimate for users who share knowledge about a label for a location, for example, employees of an enterprise having a facility in which rooms are named.

At block 1620, the process computes an intersection of the final polygon with a set of street addresses that are known to be accurate and relevant to a given user. At block 1622, if a given address is contained by the polygon, then that street address is used as the final proposition for the location of the label. For example, for conference rooms within a building, the address of the building is proposed as the location of the rooms, if the building's address is available.

At block 1624, otherwise, the polygon is used internally as a location indicator for some purposes, but the user may not be asked to confirm the polygon as their location. For example, at block 1624 a polygon may have been constructed that is likely to be correct, without sufficient confidence to use as an assertion rather than a street address.

Figure 19:
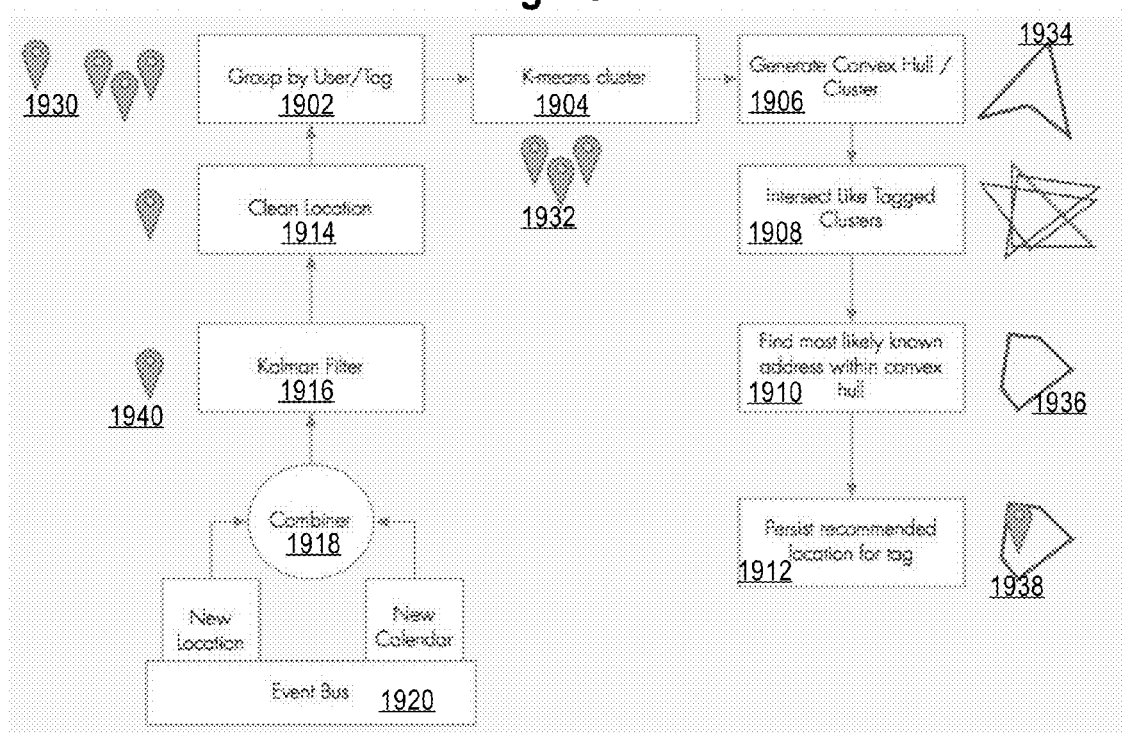
FIG. 19 illustrates an alternate view of the process of FIG. 16, with annotations indicating the result data provided by process steps indicated in blocks of the diagram.

FIG. 19 illustrates an alternate view of the process of FIG. 16, with annotations indicating the result data provided by process steps indicated in blocks of the diagram.

Starting at event bus 1902, new location values and new calendar items are provided to a data combiner 1918 and then to a Kalman filter, which results in forming a first location value represented by map pin 1940. Normalization algorithms may be used to modify the first location value to result in a clean location value. Repetition of the foregoing steps results in creating and storing a plurality of location identifiers represented by map pins 1930.

At block 1902, the plurality of location identifiers represented by map pins 1930 is grouped by user identifier and location label and then provided to K-means clustering step 1904, which results in forming a plurality of clusters like cluster 1932. Generating a convex hull based on the cluster 1906 results in stored data representing a convex hull 1934. Like tagged clusters are intersected at step 1908 and the most likely known address within the intersection hull 1936 is determined at step 1910. At step 1912, a recommended geographical location 1938 for a particular location tag is persistently stored in a database record.

Figure 23:
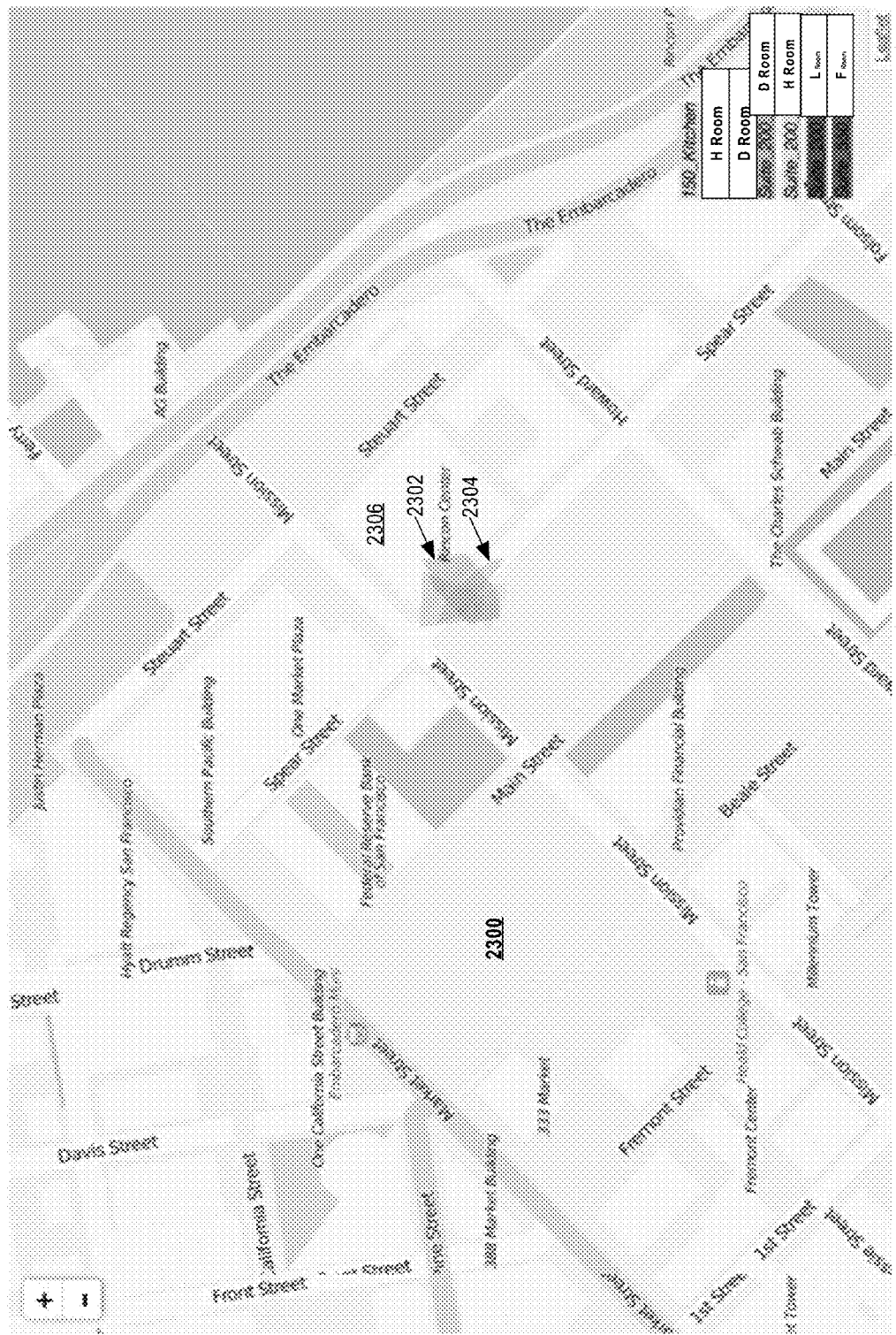
FIG. 23 illustrates a plurality of colored polygons each representing a final alpha shapes indicating the location of a conference room in an office building based upon analysis of calendar data and location data for multiple users and multiple occurrences of visits to the rooms.

FIG. 23 illustrates a plurality of colored polygons 2302, 2304 each representing a final alpha shapes indicating the location of a conference room in an office building 2306 shown in a city map 2300 and based upon analysis of calendar data and location data for multiple users and multiple occurrences of visits to the rooms.

3.14 Determining Comparable Routes that Lack Map Coordinate Data Using Alpha Shapes Approaches 3.14.1—Fitness Suggestions In an embodiment, the approach of FIG. 16 may be used for analyzing and comparing routes. Comparing routes may be useful, for example, for identifying two or more users who regularly use the same route, for purposes of suggesting joint exercise activities such as running or cycling, suggesting meetings, suggesting ride-sharing or carpooling, or other purposes.

Figure 17:
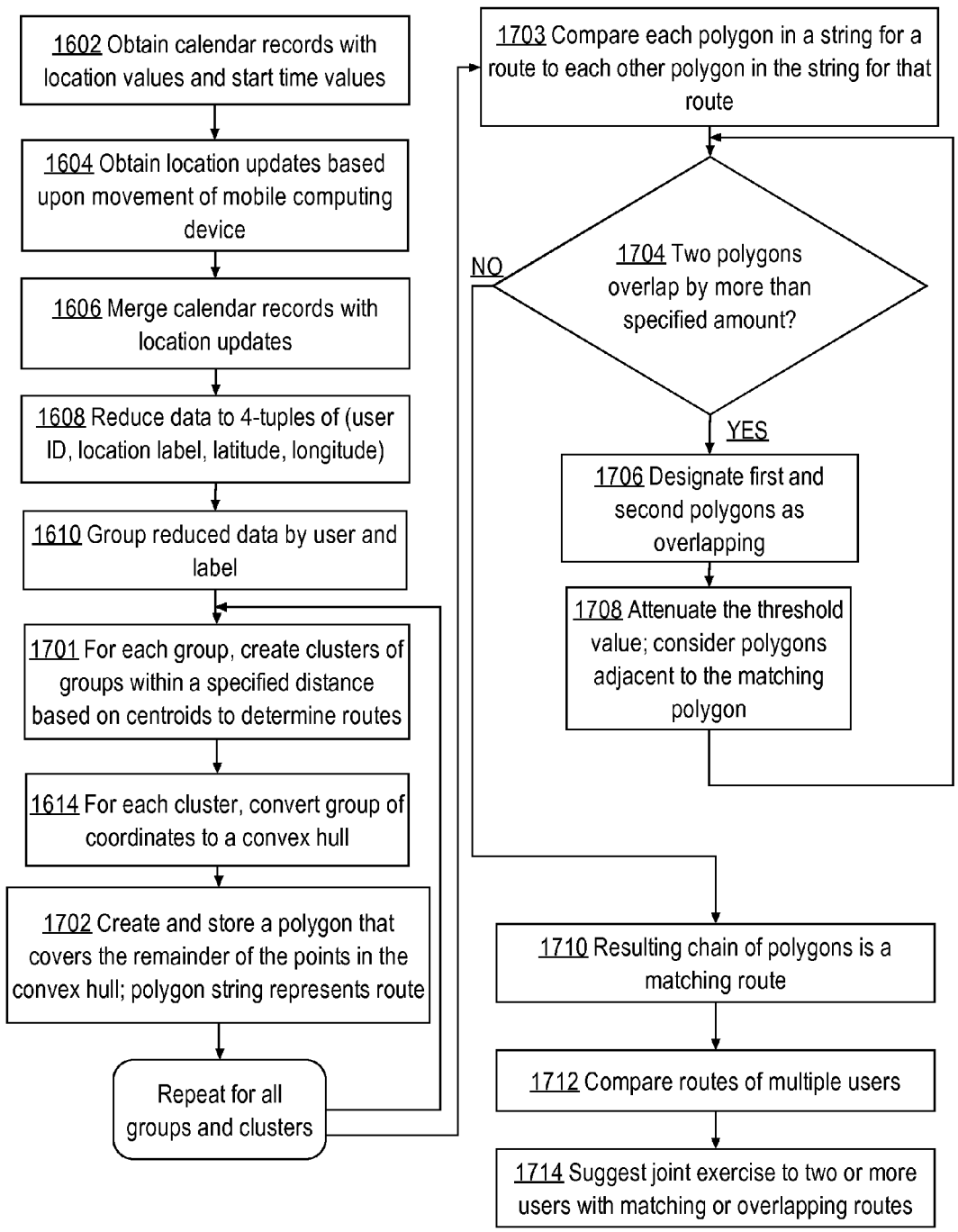
FIG. 17 illustrates an example process for suggesting fitness activities. In an embodiment, the modified approach uses the operations shown in block 1602, 1604, 1606, 1608, 1610 of FIG. 16.

FIG. 17 (6) illustrates an example process for suggesting fitness activities. In an embodiment, the modified approach uses the operations shown in block 1602, 1604, 1606, 1608, 1610 of FIG. 16. In some cases, the use of calendar records at block 1602, 1606 may be omitted; for example, many individuals who are involved in regular exercise activities involving movement, such as running or cycling, do not create calendar records for the activity or destinations associated with it.

In an embodiment, at block 1701, clustering involves the following sub steps:

1. Select the first location from a route as a candidate centroid.
2. While there are more locations on the route:
2.a. Select the next location on the route.
2.b. Compare the selected next location to all candidate centroids, and assign the selected next location to the closest centroid.
2.c. If none of the candidate centroids is close enough, then add the selected next location as a candidate centroid.
2.d. Assign centroids to the mean of their assigned locations.

Thereafter, the clusters are transformed into polygons as seen in block 1614, 1702. As a result, each route is now represented as a set or string of polygons.

At block 1703, each polygon in a string for a route is compared to each other polygon in the string for that route. If a first polygon overlaps a second polygon by more than a specified amount, as tested at block 1704, then at block 1706 the first polygon and second polygon are designated as overlapping, and at block 1708, the polygons immediately prior to and following the matching polygon are compared with an attenuated threshold value. The loop represented by block 1702, 1704, 1706, 1708 proceeds until no more polygons overlap.

At block 1710, the resulting chain of polygons is considered the "matching route," that is, a set of route data that is useful for purposes of matching to routes of other users. The resulting chain of polygons may be stored in association with data identifying a particular user.

Thereafter, at block 1712, a comparison of a plurality of routes of users is performed. Block 1712 may be performed periodically at different intervals as routes are identified and stored. If the matching route of a first user is more than a certain percentage of a route associated with a second user, then the routes are considered a strong match. In response, at block 1714, an assertion that both users should exercise together can be made.

Figure 21:
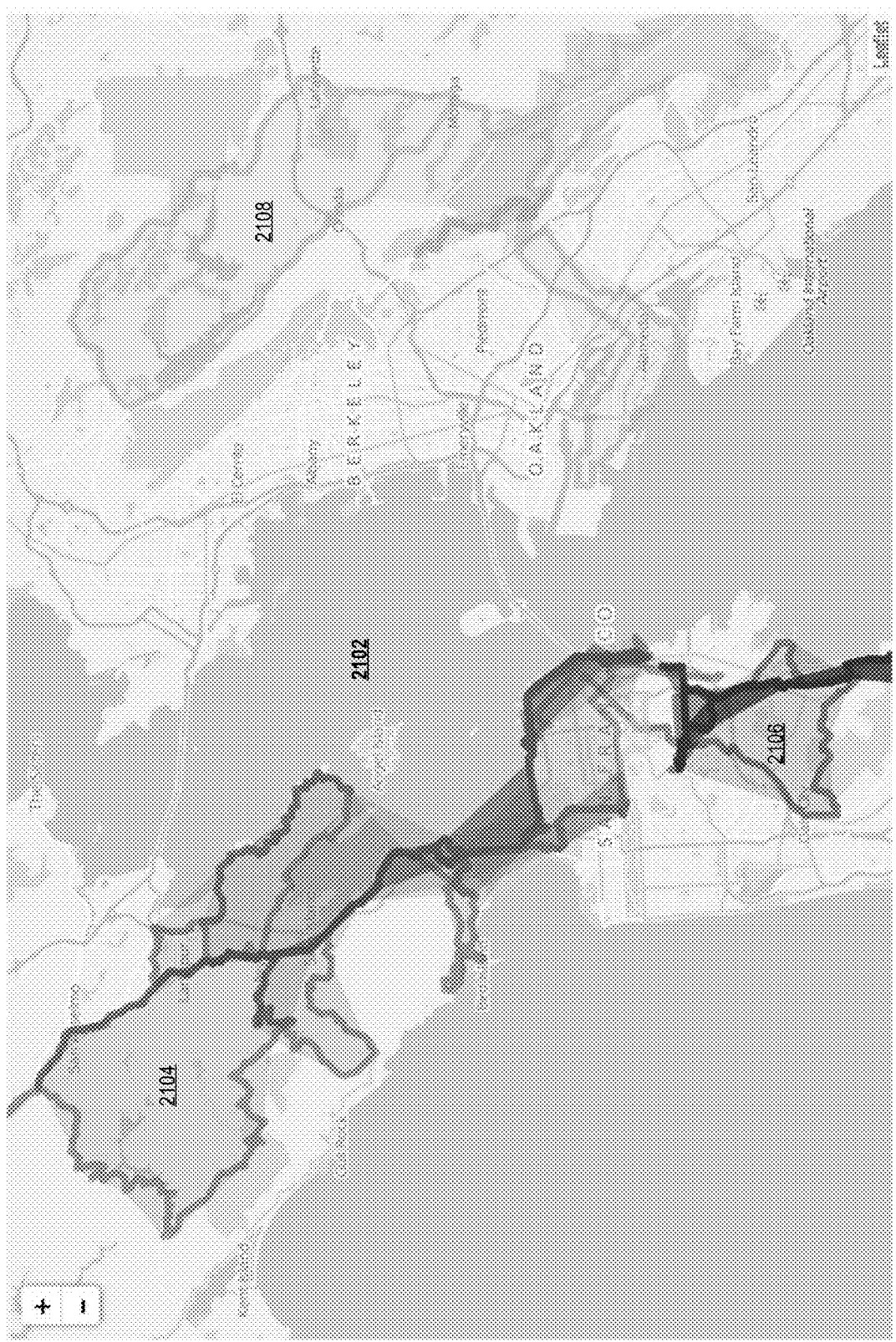
FIG. 21 illustrates an example regional map in which a plurality of individual routes of cyclists are indicated using colored lines, and in which colored alpha shapes indicate areas of inclusion of the routes for purposes of matching with others.

FIG. 21 illustrates an example regional map 2102 in which a plurality of individual routes of cyclists are indicated using colored lines, and in which colored alpha shapes 2104, 2106, 2108 indicate areas of inclusion of the routes for purposes of matching with others.

FIG. 22 illustrates an example comparison chart 2202 that could be used to determine whether to recommend that pairs of users may wish to perform fitness activities together. Numeric values 2204 indicate amounts of overlap between routes of pairs of users 2206, where the amount of overlap is too small to make a recommendation. Certain blocks 2208 indicate user pairs whose routes are not compatible. Other blocks 2210 indicate user pairs whose routes are compatible, and for whom recommendations should be given; the numeric values for these pairs of users are sufficiently high to support a recommendation.

3.15 Identifying Commuting Routes of a User

Figure 18A:
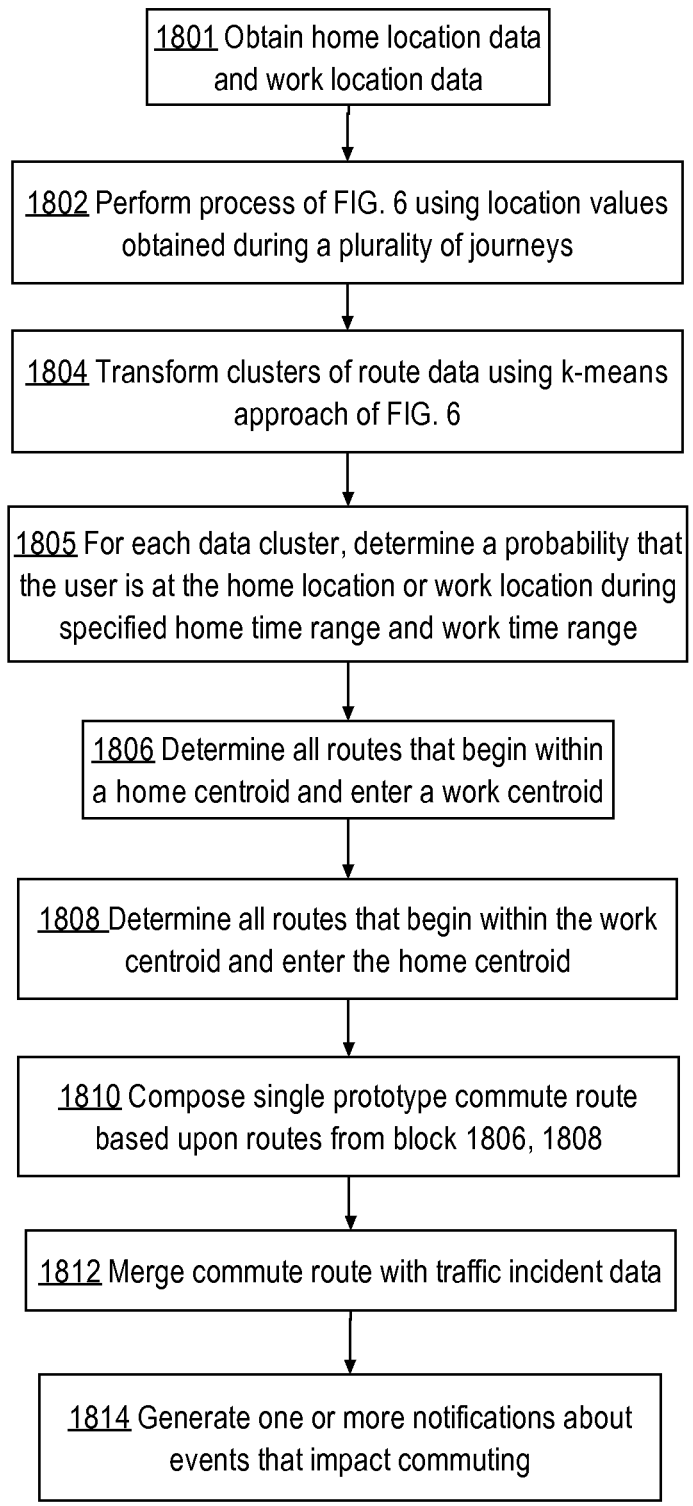
FIG. 18A illustrates an example process of identifying data as representing a home-work commuting route of a user.
Figure 18B:
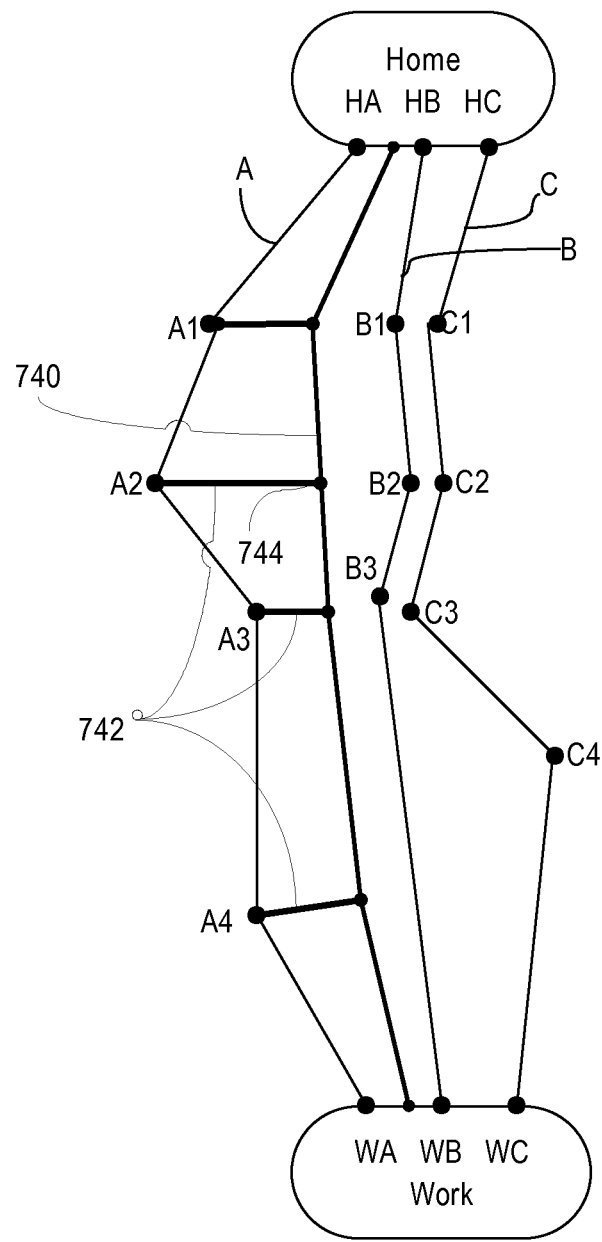
FIG. 18B illustrates hypothetical routes and springs.

FIG. 18A illustrates an example process of identifying data as representing a home-work commuting route of a user. FIG. 18B illustrates hypothetical routes and springs. In some embodiments, identifying a commuting route of a particular user may be useful for the purpose of alerting the user to traffic accidents, failures in public transit, major social events, and other issues or events that could increase commute travel time or otherwise adversely affect the user's commuting process.

In an embodiment, FIG. 18A is predicated on the presumption that a home location and a work location are the most likely locations of the user during the hours of 9:00 pm to 6:00 am, and 9:00 am to 5:00 pm, respectively. At block 1801, home location data and work location data are obtained. The process of FIG. 18A presumes that a home location of the user and an office location of a user have been determined previously; in one embodiment, user-specified configuration data may indicate a home location and a work location. Additionally or alternatively, the user's home location and work location may be computed based upon identifying locations of the mobile computing device that occur repeatedly during the above-specified time ranges.

In an embodiment, as seen at block 1802 the alpha shapes approach of FIG. 17 may be implemented using location values obtained from the mobile computing device during a plurality of journeys. These journeys may or may not occur between the home location and the work location, and therefore added analysis of the data is performed to determine whether the journeys appear to represent commuting journeys.

At block 1804, and the data may be quantized using the same k-means approach as for the alpha shapes approaches of FIG. 17, while examining which cluster has the greatest probability of containing the user during the home time range and the work time range as seen at block 1805. In an embodiment, the probability determination is performed using a naïve Bayesian computation with a training range of times at each quantized cell, and predicting the cell identifier. Thus, in some embodiments the locations are quantized into polygons for ease of calculation using dynamic k-means as described for FIG. 16, FIG. 17; clusters are then processed into an inversely (to location density) weighted Voronoi tessellation around the centroids to determine a complete polygon set for all the area a user has been in. Each of these polygons is labeled uniquely and becomes a quailed cell in the system. Naive Bayes may be used to determine the likelihood of a user being in a given location cell based on the normalized product of probabilities that a user has been seen in a given cell previously, or that a user has a high probability of transitioning into the cell given their previous location.

At block 1806, the process determines all routes that begin within the home centroid and enter the work centroid. In some embodiments, the home centroid and the work centroid are equivalent to the values obtained at block 1802; in other embodiments, the centroid values may be offset or a range of tolerances may be used. At block 1808, the converse process is performed for work to home routes.

At block 1810, the routes resulting from block 1806, block 1808 are composed into a single, prototypical route. In one embodiment, block 1810 comprises first identifying a plurality of routes that link the home location and work location and classifying those routes as prototypical commuting routes. Second, a plurality of springs are assigned; each spring is a line between a recorded location in the routes and the home and work locations. At block 1810, the system of springs is then allowed to relax to minimize the overall energy in the system, resulting in storing a single presumed commute route for the user. Relaxing the springs may be performed by changing values of spring constants.

Referring now to FIG. 18B, as an example, a Home location and a Work location may be associated with three (3) observed routes A, B, C, which begin respectively at home locations HA, HB, HC and end at work locations WA, WB, WC. Locations HA, HB, HC all are within or near the centroid of the Home location and locations WA, WB, WC all are near the Work centroid. Route A may comprise geographic points A1, A2, A3, A4 at which location values were obtained as a result of events published at different times representing movement of a mobile computing device. Similarly route B comprises points B1, B2, B3 and route C comprises points C1, C2, C3, C4 at from which location updates were obtained.

In an embodiment, a prototype route 1840 is formed based upon computing differences between nearby points of routes A, B, C and establishing vector springs 1842 that join points on the prototype route and each of the points of each of the observed routes. For purposes of illustrating a clear example, FIG. 18B shows springs 1842 only for points on route A; however, in an embodiment vector springs may be established between the prototype route and all points of other routes B, C, etc.

The maximum permitted length or magnitude of springs 1842 may vary according to configuration data. The magnitude of each of the springs 1842 then may be minimized to determine final points along the prototype route 1840. In the example of FIG. 18B, assume that a particular point 1844 has a first spring 1842 between point A2 and point 1844, and additional springs from each of points B2, C2 to the point 1844. The magnitude of the spring from point B2 to point 1844 is less than the magnitude of a spring 1842 from A2 to point 1844 and from C2 to point 1844. A relaxation or minimization with respect to the particular point 1844 might result in reducing the magnitude of the first spring 1842 at point A2, and the spring from C2 to the prototype, to have magnitudes equal to that of a spring from B2 to the prototype route and then recalculating a position of point 1844 to result in a final point along a presumed commute route.

At block 1812, the commute route is merged with traffic incident data about events that may negatively impact a commute. For example, block 1812 may involve searching a database of traffic incidents for records reflecting incidents having incident location values that are between the Home and Work locations, or between a segment of the commute route such as a segment between the point 1844 and the Home location. Matching traffic incident records could be copied into a result set. At block 1814, one or more notifications are generated relating to the events from the traffic incident data that matched.

Figure 20:
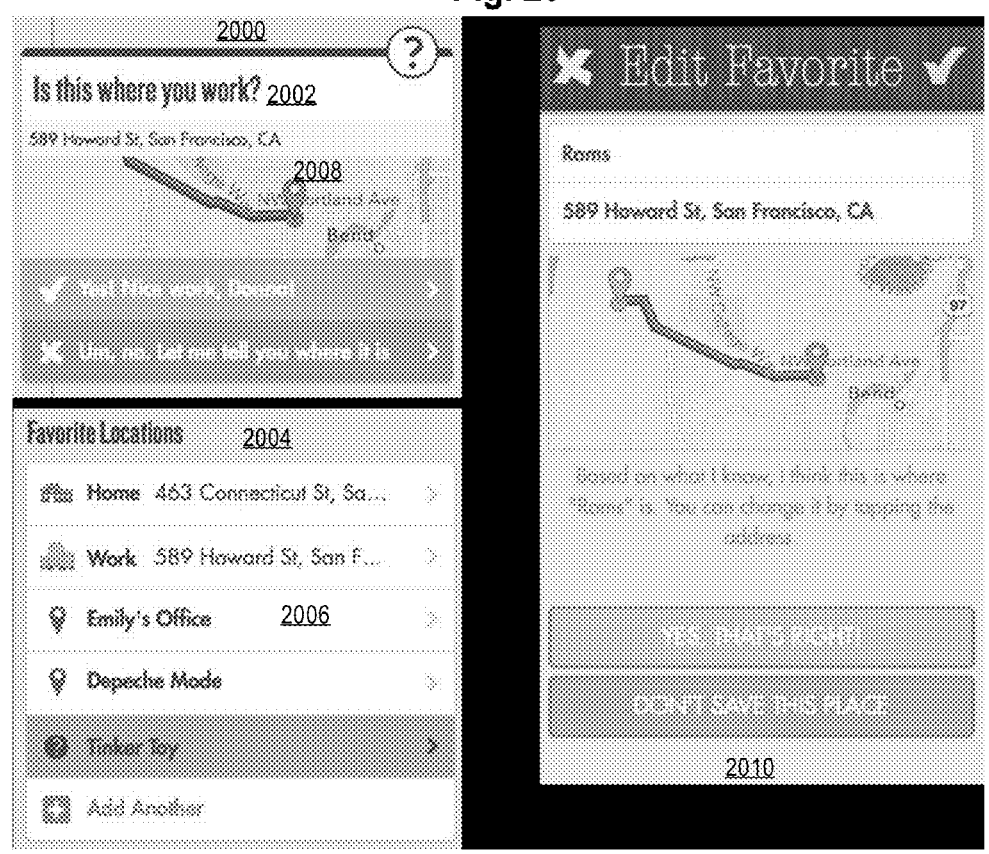
FIG. 20 illustrates examples of graphical user interface elements that may be provided in an embodiment.

FIG. 20 illustrates examples of graphical user interface elements that may be provided in an embodiment. A first GUI panel 2000 contains a prompt 2002 for the user to confirm that the correct work location has been identified or to provide manual input for a work location. A second GUI panel 2004 contains a list 2006 of favorite locations, in association with graphical icons that indicate the nature of a location. Distinctive icons 2008 may be used to identify a confirmed home location, a confirmed work location, other points of interest with confirmed accuracy that is indicated using map pin icons, and other points of interest with unconfirmed accuracy indicated using a question mark icon. In an embodiment, selecting other locations with unconfirmed accuracy causes the productivity application to initiate a dialog with the user to specify attributes of a location or to indicate the nature or purpose of the location. In an embodiment, a third GUI panel 2010 is displayed during the dialog and the user then may confirm the name and geographic location of the point of interest, or provide alternate data.

4. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
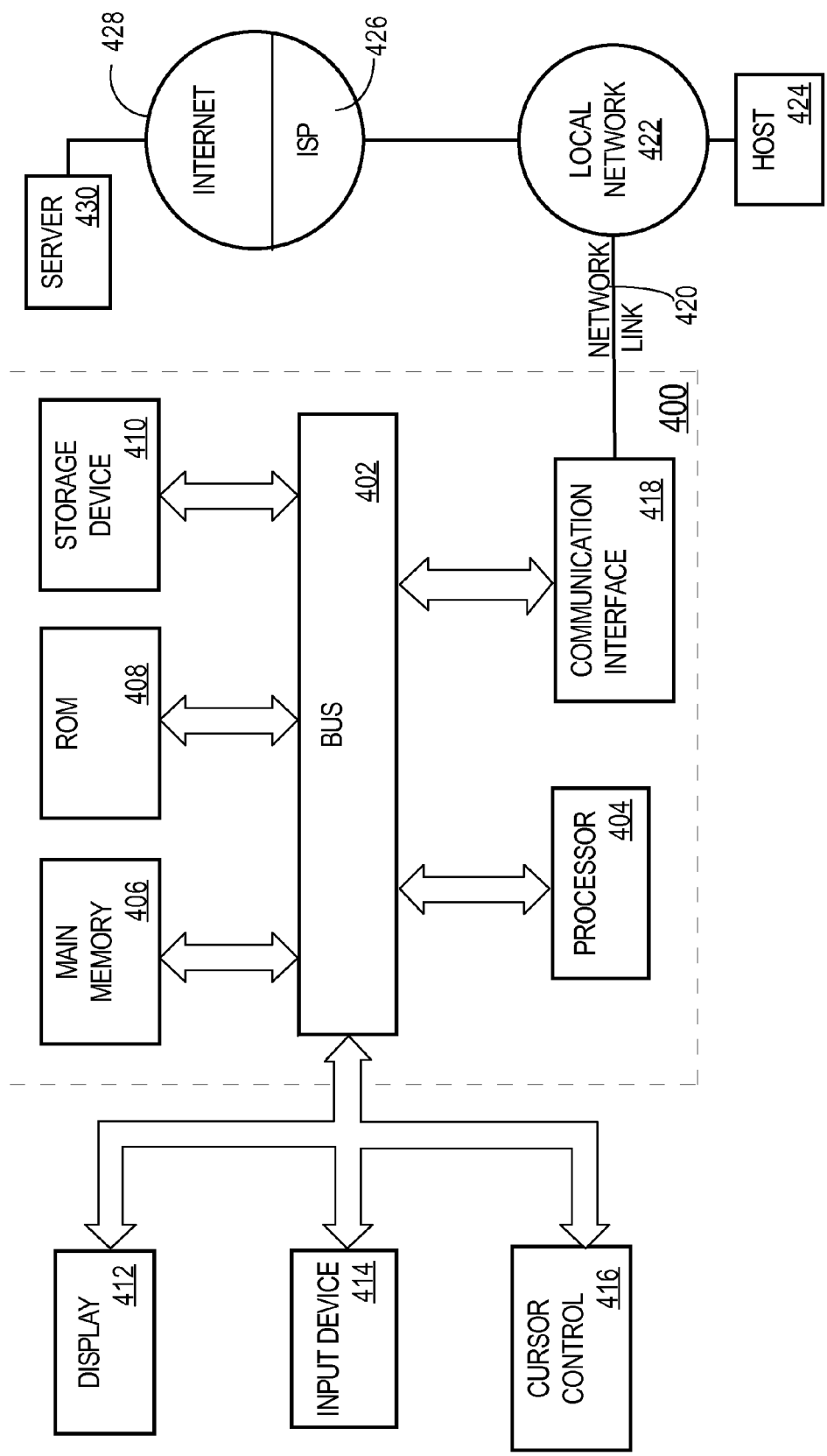
FIG. 4 illustrates a computer system with which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method providing an improvement in personal tracking, the method comprising:

using a server computer, obtaining a plurality of personal calendar records, wherein each of the calendar records comprises a location value specifying a location of an event, and a start time value specifying a start time of an event at the location;

using the server computer, obtaining a plurality of present location updates, wherein each of the present location updates comprises a geo-location value indicating a then-current geographical location of a mobile computing device;

using the server computer, creating and storing polygon data that defines a polygon in geographical space that contains a final set of the plurality of location values;

using the server computer, determining a street address that is contained in the polygon;

using the server computer, creating and storing a database record that associates a particular calendar record with the street address;

using the server computer, repeating the previously recited steps two or more times to store two or more polygon data;

using the server computer, comparing two or more of the polygon data in response to determining that a particular two or more of the polygon data represent geographical areas that overlap by more than a specified amount, designating the particular two or more of the polygon data as overlapping and as representing a route;

using the server computer, comparing a plurality of routes of a plurality of different user accounts, and in response to the comparison indicating a match of the plurality of routes, generating and sending a suggestion message to the plurality of different user accounts.

2. The method of claim 1, further comprising merging the plurality of personal calendar records with the plurality of present location updates, reducing the merged records to form a plurality of four-tuples of (user identifier, location label, latitude, longitude) of reduced data, wherein the user identifier is associated with the mobile computing device, the location label represents the location and the latitude and longitude reflect the then-current geographical location.

3. The method of claim 2, further comprising: grouping the reduced data by user identifier and location label into a plurality of groups; for each group therein, using the server computer, creating a plurality of clusters of the groups, wherein each of the clusters contains those groups having location values that are within a specified distance threshold; for each particular cluster of the clusters, converting the location values of the groups in the particular cluster to a convex hull; creating and storing the polygon data to cover remainder points in the convex hull; repeating the foregoing for all of the groups to create and store a plurality of polygons.

4. The method of claim 3, further comprising grouping the plurality of polygons based upon the location labels; merging all particular polygons having the same location label and that intersect with a particular level of coverage to result in the polygon; associating a street address that is contained in the polygon with the location label.

5. The method of claim 1, further comprising attenuating the specified amount and repeating the process of claim 1 to increase a number of the polygon data that are overlapping and represent a route.

6. The method of claim 1 further comprising:
obtaining home location data specifying a home location of a particular user account, and obtaining work location data specifying a work location of the same particular user account;
for a particular time range, determining a home probability value indicating a probability that a user associated with the user account is at the home location, and determining a work probability value indicating a probability that the user associated with the user account is at the work location.

7. The method of claim 6 further comprising:
grouping the reduced data by user identifier and location label in a plurality of groups; for each group therein, using the server computer, creating a plurality of clusters of groups, wherein each of the clusters contains those groups having location values that are within a specified distance; for each particular cluster of the clusters, converting the location values of the groups in the particular cluster to a convex hull; creating and storing the polygon data to cover remainder points in the convex hull;
for each particular cluster, determining the home probability value indicating a probability that a user associated with the user account is at the home location, and determining a work probability value indicating a probability that the user associated with the user account is at the work location;
determining the prototype commute route based at least in part upon the home probability value and the work probability value.

8. The method of claim 1 further comprising:
using the server computer, composing a single prototype commute route based upon determining all routes in the plurality of routes that begin with a home centroid and that enter a work centroid and determining all routes in the plurality of routes that begin with the work centroid and enter the home centroid;
using the server computer, obtaining a plurality of traffic incident data and merging the traffic incident data with the prototype commute route;

based upon the traffic incident data and the prototype commute route, generating one or more notifications about events that impact commuting and causing sending the one or more notifications to the user account.

9. The method of claim 8 further comprising:
using the server computer, generating and providing to a mobile computing device associated with the user account, display data sufficient to generate a graphical user interface display that shows the single prototype commute route and requests confirmation that the single prototype commute route is correct;
receiving input from the mobile computing device specifying that the single prototype commute route is incorrect and specifying a plurality of endpoints in a map that specify the single prototype commute route.

10. A data processing method comprising:
using a server computer, obtaining from one or more non-transitory computer-readable data storage media a copy of one or more sequences of instructions that are stored on the media and which when executed using a particular user computer among a plurality of user computers cause the particular user computer to perform:
using the particular user computer alone or in combination with the server computer,
using the server computer, obtaining a plurality of personal calendar records, wherein each of the calendar records comprises a location value specifying a location of an event, and a start time value specifying a start time of an event at the location;
using the server computer, obtaining a plurality of present location updates, wherein each of the present location updates comprises a geo-location value indicating a then-current geographical location of a mobile computing device;
using the server computer, creating and storing polygon data that defines a polygon in geographical space that contains a final set of the plurality of location values;
using the server computer, determining a street address that is contained in the polygon;
creating and storing a database record that associates a particular calendar record with the street address;
using the server computer, downloading the copy of the one or more sequences of instructions to any user computer among the plurality of user computers;
using the particular user computer alone or in combination with the server computer, repeating the previously recited steps two or more times to store two or more polygon data;
using the server computer, comparing two or more of the polygon data in response to determining that a particular two or more of the polygon data represent geographical areas that overlap by more than a specified amount, designating the particular two or more of the polygon data as overlapping and as representing a route;
using the server computer, comparing a plurality of routes of a plurality of different user accounts, and in response to the comparison indicating a match of the plurality of routes, generating and sending a suggestion message to the plurality of different user accounts.

11. The method of claim 10 further comprising:
using the server computer, composing a single prototype commute route based upon determining all routes in the plurality of routes that begin with a home centroid and that enter a work centroid and determining all routes in the plurality of routes that begin with the work centroid and enter the home centroid;

using the server computer, obtaining a plurality of traffic incident data and merging the traffic incident data with the prototype commute route;

based upon the traffic incident data and the prototype commute route, generating one or more notifications about events that impact commuting and causing sending the one or more notifications to the user account.

12. A computer system providing an improvement in personal tracking, the system comprising:

a server computer comprising one or more non-transitory computer-readable data storage media stored with one or more sequences of instructions which when executed using a particular user computer among a plurality of user computers cause the particular user computer to perform:

using the server computer, obtaining a plurality of personal calendar records, wherein each of the calendar records comprises a location value specifying a location of an event, and a start time value specifying a start time of an event at the location;

using the server computer, obtaining a plurality of present location updates, wherein each of the present location updates comprises a geo-location value indicating a then-current geographical location of a mobile computing device;

using the server computer, creating and storing polygon data that defines a polygon in geographical space that contains a final set of the plurality of location values;

using the server computer, determining a street address that is contained in the polygon;

using the server computer, creating and storing a database record that associates a particular calendar record with the street address;

in the server computer, stored downloading instructions which, when executed using the server computer, cause downloading a plurality of copies of the one or more sequences of instructions to the plurality of user computers;

using the server computer, repeating the previously recited steps two or more times to store two or more polygon data;

using the server computer, comparing two or more of the polygon data in response to determining that a particular two or more of the polygon data represent geographical areas that overlap by more than a specified amount, designating the particular two or more of the polygon data as overlapping and as representing a route;

using the server computer, comparing a plurality of routes of a plurality of different user accounts, and in response to the comparison indicating a match of the plurality of routes, generating and sending a suggestion message to the plurality of different user accounts.

13. The computer system of claim 12 wherein the data storage media comprise sequences of instructions which when executed cause merging the plurality of personal calendar records with the plurality of present location updates, reducing the merged records to form a plurality of four-tuples of (user identifier, location label, latitude, longitude) of reduced data, wherein the user identifier is associated with the mobile computing device, the location label represents the location and the latitude and longitude reflect the then-current geographical location.

14. The computer system of claim 13 wherein the data storage media comprise sequences of instructions which when executed cause grouping the reduced data by user identifier and location label into a plurality of groups; for each group therein, using the server computer, creating a plurality of clusters of the groups, wherein each of the clusters contains those groups having location values that are within a specified distance threshold; for each particular cluster of the clusters, converting the location values of the groups in the particular cluster to a convex hull; creating and storing the polygon data to cover remainder points in the convex hull; repeating the foregoing for all of the groups to create and store a plurality of polygons.

15. The computer system of claim 14 wherein the data storage media comprise sequences of instructions which when executed cause grouping the plurality of polygons based upon the location labels; merging all particular polygons having the same location label and that intersect with a particular level of coverage to result in the polygon; associating a street address that is contained in the polygon with the location label.

16. The computer system of claim 12 wherein the data storage media comprise sequences of instructions which when executed cause attenuating the specified amount and repeating the steps recited in claim 15 to increase a number of the polygon data that are overlapping and represent a route.

17. The computer system of claim 12 wherein the data storage media comprise sequences of instructions which when executed cause:

obtaining home location data specifying a home location of a particular user account, and obtaining work location data specifying a work location of the same particular user account;

for a particular time range, determining a home probability value indicating a probability that a user associated with the user account is at the home location, and determining a work probability value indicating a probability that the user associated with the user account is at the work location.

18. The computer system of claim 17 wherein the data storage media comprise sequences of instructions which when executed cause:

grouping the reduced data by user identifier and location label in a plurality of groups; for each group therein, using the server computer, creating a plurality of clusters of groups, wherein each of the clusters contains those groups having location values that are within a specified distance; for each particular cluster of the clusters, converting the location values of the groups in the particular cluster to a convex hull; creating and storing the polygon data to cover remainder points in the convex hull;

for each particular cluster, determining the home probability value indicating a probability that a user associated with the user account is at the home location, and determining a work probability value indicating a probability that the user associated with the user account is at the work location;

determining the prototype commute route based at least in part upon the home probability value and the work probability value.

19. The computer system of claim 12 wherein the data storage media comprise sequences of instructions which when executed cause:

using the server computer, composing a single prototype commute route based upon determining all routes in the plurality of routes that begin with a home centroid and that enter a work centroid and determining all routes in the plurality of routes that begin with the work centroid and enter the home centroid;

using the server computer, obtaining a plurality of traffic incident data and merging the traffic incident data with the prototype commute route;

based upon the traffic incident data and the prototype commute route, generating one or more notifications about events that impact commuting and causing sending the one or more notifications to the user account.

20. The computer system of claim 19 wherein the data storage media comprise sequences of instructions which when executed cause:

using the server computer, generating and providing to a mobile computing device associated with the user account, display data sufficient to generate a graphical user interface display that shows the single prototype commute route and requests confirmation that the single prototype commute route is correct;

receiving input from the mobile computing device specifying that the single prototype commute route is incorrect and specifying a plurality of endpoints in a map that specify the single prototype commute route.

* * * * *